US012795344B2

(12) United States Patent
Gao et al.

(10) Patent No.: US 12,795,344 B2
(45) Date of Patent: Nov. 10, 2026

(54) COMMUNICATION METHOD AND APPARATUS

(71) Applicant: HUAWEI TECHNOLOGIES CO., LTD., Shenzhen (CN)

(72) Inventors: Lei Gao, Beijing (CN); Chao Quan, Beijing (CN); Xingqing Cheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 40 days.

(21) Appl. No.: 18/593,640

(22) Filed: Mar. 1, 2024

(65) Prior Publication Data

US 2024/0205662 A1 Jun. 20, 2024

Related U.S. Application Data

(63) Continuation of application No. PCT/CN2022/113700, filed on Aug. 19, 2022.

(30) Foreign Application Priority Data

Sep. 1, 2021 (CN) ......................... 202111023885.3

(51) Int. Cl.
*H04W 8/00* (2009.01)
*H04L 5/00* (2006.01)
*H04W 74/0816* (2024.01)

(52) U.S. Cl.
CPC ........... *H04W 8/005* (2013.01); *H04L 5/0012* (2013.01); *H04W 74/0816* (2013.01)

(58) Field of Classification Search
None
See application file for complete search history.

(56) References Cited

U.S. PATENT DOCUMENTS

| | | | | |
|---|---|---|---|---|
| 9,843,986 | B2 | 12/2017 | Poitau et al. | |
| 2017/0294939 | A1* | 10/2017 | Wang | H04B 1/713 |
| 2019/0274090 | A1* | 9/2019 | Zhang | H04W 48/16 |
| 2020/0305123 | A1* | 9/2020 | Takeda | H04W 8/24 |
| 2021/0105821 | A1 | 4/2021 | Niu et al. | |
| 2022/0337998 | A1* | 10/2022 | Tian | H04W 80/02 |

FOREIGN PATENT DOCUMENTS

| | | | | |
|---|---|---|---|---|
| CN | 111867129 | A * | 10/2020 | H04W 74/0833 |
| JP | 2018518114 | A | 7/2018 | |
| WO | 2014087720 | A1 | 6/2014 | |
| WO | 2017170448 | A1 | 10/2017 | |

* cited by examiner

*Primary Examiner* — Pao Sinkantarakorn
*Assistant Examiner* — Luis Guillermo Lema Lemos
(74) *Attorney, Agent, or Firm* — Leydig, Voit & Mayer, Ltd

(57) ABSTRACT

A method includes: A first node sends a first message on at least one broadcast frequency hopping channel, where the first message indicates a first resource on a first frequency hopping channel. The first node sends a second message on the first resource, where the second message indicates a second resource, and the second resource includes at least one third resource used to carry a request message. A second node receives the first message and the second message from the first node, selects a third resource from the at least one third resource, and sends a request message based on the third resource. The first node detects the request message on the at least one third resource.

21 Claims, 6 Drawing Sheets

COMMUNICATION METHOD AND APPARATUS

CROSS-REFERENCE TO RELATED APPLICATIONS

This application is a continuation of International Application No. PCT/CN2022/113700, filed on Aug. 19, 2022, which claims priority to Chinese Patent Application No. 202111023885.3, filed on Sep. 1, 2021. The disclosures of the aforementioned applications are hereby incorporated by reference in their entireties.

TECHNICAL FIELD

This application relates to the communication field, and in particular, to a communication method and apparatus.

BACKGROUND

Wireless communication technologies are widely used in fields such as an intelligent cockpit, a smart household, intelligent traffic, and intelligent transportation. In a wireless communication scenario, a node needs to establish a communication connection to another node by sequentially using a discovery request message and an access request message, and a communication domain may be formed after a plurality of communication links are established between a plurality of nodes.

Discovery/connection concurrency conditions on a node differ greatly in different scenarios. For example, in a battery management system, a large quantity of nodes (communication nodes of a battery cell or a battery module) expect to rapidly establish connections to a management node of a battery management module during initial startup. In this case, discovery/connection concurrency is high. However, in a normal running scenario, a small quantity of nodes expect to establish connections to the communication node of the battery management module. In this case, the discovery/connection concurrency is low. Therefore, how to reduce a discovery/connection delay and a resource waste in various scenarios in which discovery/connection concurrency differs is an urgent problem to be resolved.

SUMMARY

This application discloses a communication method and apparatus, to flexibly configure a resource for discovery/connection. This can effectively reduce a discovery/connection delay and a resource waste in scenarios in which discovery/connection concurrency differs, and can improve communication efficiency.

According to a first aspect, this application provides a communication method. The method includes: sending a first message on at least one broadcast frequency hopping channel, where the first message indicates a first resource on a first frequency hopping channel; sending a second message on the first resource, where the second message indicates a second resource, and the second resource includes at least one third resource; and detecting a request message on the at least one third resource, where the request message includes a discovery request message and/or an access request message.

The foregoing method may be applied to a first node. The first node may be a primary node in an in-vehicle wireless communication scenario, for example, a cockpit domain controller (cockpit domain controller, CDC), a passive entry passive start (passive entry passive start, PEPS) system, or a mobile phone. The first node may alternatively be a base station, user equipment (user equipment, UE), or the like in a wide-area wireless communication system. The first node may alternatively be a base station, an access point (access point, AP), or the like in a local-area wireless communication system. The AP may be a wireless AP such as a wireless router, a wireless gateway, or a wireless bridge.

The first frequency hopping channel may be a common frequency hopping channel. The second message may be an extended broadcast message.

In a specific implementation, the request message includes but is not limited to the discovery request message and/or the access request message. The discovery request message may also be referred to as a scan request message, a scan message, a discovery message, or the like. The access request message may also be referred to as a connection request message, a connection message, an access message, or the like.

It should be noted that the first node may detect the request message on the at least one third resource. In other words, each node may select one of the at least one third resource to send a request message of the node. A node cannot know a third resource selected by another node. Therefore, a plurality of nodes may select a same third resource. In other words, there are a plurality of request messages on the same third resource. In this case, the plurality of request messages on the same third resource conflict. Consequently, the first node may correctly receive only one of the request messages on the third resource, or cannot correctly receive any request message on the third resource. In addition, if a third resource is not selected by any node, that is, no node sends a request message on the third resource, the first node detects no request message on the third resource.

In the foregoing method, the second message may indicate at least one resource used to carry the request message, so that a resource for discovery/connection is flexibly configured. The first node flexibly configures a resource for discovery/connection based on current discovery/connection concurrency, which can reduce a discovery/connection delay. In addition, this further reduces a resource waste, and improves communication efficiency.

Optionally, the second message includes information that indicates a quantity of third resources included in the second resource.

In the foregoing implementation, the quantity of third resources in the second resource may be indicated through the second message. In other words, the quantity of third resources can be configured. The first node flexibly configures a quantity of resources for discovery/connection based on current discovery/connection concurrency. If the current discovery/connection concurrency is high, a larger quantity of resources are configured, to reduce a discovery/connection delay. If the current discovery/connection concurrency is low, a smaller quantity of resources are configured, to reduce a resource waste.

Optionally, the second resource further includes at least one fourth resource, the at least one fourth resource is used to carry at least one response message, and the at least one response message corresponds to a request message from the at least one third resource.

In the foregoing implementation, the extended broadcast message indicates that the second resource further includes a fourth resource carrying a response message. If the first node receives a request message on the at least one third resource, the first node may send a response message on a fourth resource. Correspondingly, a node that sends the request message detects a result of the corresponding response message on the fourth resource, to determine whether the request message is received by the first node.

Optionally, the second resource is a transmission opportunity group, the transmission opportunity group includes at least one transmission opportunity, and each transmission opportunity includes a third resource.

The transmission opportunity group may also be referred to as a transmission group or a transmission resource group. Alternatively, the transmission group may be referred to as an event, or the like. The transmission opportunity group is a segment of consecutive time domain resources (or a segment of resources that are consecutive in time domain).

The transmission opportunity group includes at least one transmission opportunity. The transmission opportunity may be briefly referred to as a transmission, and is used to provide an opportunity for information transmission between communication nodes. The transmission opportunity may alternatively be referred to as a sub-event. One transmission opportunity includes a resource for transmitting one message (such as one request message) or a plurality of related messages (such as one request message and one response message).

Transmission patterns of different transmission opportunities in one transmission opportunity group are the same. That transmission patterns of two different transmission opportunities are the same may be that quantities of resources configured to transmit messages are the same in the two transmission opportunities. In a case in which each transmission opportunity includes a plurality of resources, functions of the resources in the transmission opportunity may be different, but resources with same functions in the two transmission opportunities are arranged in a same order. For example, a first resource in each of the two transmission opportunities is a configured resource used by a first node to receive a request message, and a second resource in each of the two transmission opportunities is a configured resource used by the first node to send a response message corresponding to the request message. Time lengths of resources that are used to transmit messages and that are in corresponding order in two different transmission opportunities with same transmission patterns may be the same or may be different. For example, lengths of first resources in the two transmission opportunities may be the same or may be different.

It may be understood that when the second resource is a transmission opportunity group, a quantity of transmission opportunities in the transmission opportunity group equals a quantity of third resources in the second resource.

Optionally, the second message further indicates a start moment of the at least one third resource or a start moment of the at least one transmission opportunity.

In the foregoing implementation, the first node detects a request message in each third resource or in each transmission opportunity based on the start moment of the at least one third resource or the start moment of the at least one transmission opportunity.

For example, the second message may include a start moment of each of the at least one third resource, or the second message may include a start moment of each of the at least one transmission opportunity.

In a specific implementation, the start moment of the at least one third resource or the start moment of the at least one transmission opportunity may alternatively be predefined by a standard protocol.

In another specific implementation, the start moment of the at least one third resource or the start moment of the at least one transmission opportunity may alternatively be determined with reference to information predefined by a standard protocol and related information indicated by the second message. For example, it is assumed that the standard protocol defines an interval between any two transmission opportunities in a transmission opportunity group. Then, a start moment of each transmission opportunity in a transmission opportunity group may be obtained with reference to the information that is about the start moment of the transmission opportunity group and that is indicated by the second message or the information that is about the start moment of the first transmission opportunity in the transmission opportunity group and that is indicated by the second message.

Optionally, the second message further includes one or more types of the following information: information about a time length of the transmission opportunity group; information about a start moment of the transmission opportunity group; information about a quantity of transmission opportunities in the transmission opportunity group; information about an interval between start moments of at least two adjacent transmission opportunities in the transmission opportunity group; information about a start moment of a first transmission opportunity in the transmission opportunity group; information about a frequency hopping channel of the transmission opportunity group or the at least one third resource; information about a hopping frequency of the transmission opportunity group or the at least one third resource; information about bandwidth of the transmission opportunity group or the at least one third resource; a frequency hopping random seed; information about an available frequency hopping channel; and clock parameter information.

The second message indicates the information about the start moment of the transmission opportunity group. In this way, the first node may configure a resource more flexibly and implement discovery/connection and another service, to multiplex a time domain resource more flexibly. Further, the first node may set an appropriate interval based on a processing delay of the node, to adapt to devices having different processing capabilities.

When the interval between the start moments of the at least two adjacent transmission opportunities in the transmission opportunity group is known, the start moment of each transmission opportunity may be determined with reference to the information about the start moment of the transmission opportunity group or the information about the start moment of the first transmission opportunity in the transmission opportunity group.

The information about the frequency hopping channel of the transmission opportunity group or the at least one third resource indicates the frequency hopping channel of the transmission opportunity group or the at least one third resource. The information about the hopping frequency of the transmission opportunity group or the at least one third resource indicates the hopping frequency of the transmission opportunity group or the at least one third resource. The hopping frequency of the transmission opportunity group or the at least one third resource is a center frequency of the frequency hopping channel of the transmission opportunity group or the at least one third resource. The information about the bandwidth of the transmission opportunity group or the at least one third resource indicates the bandwidth of the transmission opportunity group or the at least one third resource. It is assumed that the frequency hopping channel, the hopping frequency, or the bandwidth of the transmission opportunity group (or the at least one third resource) is the same as the first frequency hopping channel, a hopping frequency, or bandwidth corresponding to the second message. Interference conditions of a same hopping frequency are similar in a short time period. Therefore, transmission reliability of a request message can be improved if the frequency hopping channel, the hopping frequency, and/or the bandwidth of the transmission opportunity group or the at least one third resource are/is not changed. If the frequency hopping channel, the hopping frequency, and/or the bandwidth of the transmission opportunity group or the at least one third resource are/is changed based on the second message, the frequency hopping channel, the hopping frequency, and/or the bandwidth can be used more flexibly. In addition, this prevents a same frequency hopping channel from being occupied for an excessively long time period.

A frequency hopping channel is determined based on the frequency hopping random seed and the clock parameter information. The frequency hopping random seed may enable frequency hopping randomization between different devices (or nodes) or between different links. This prevents different devices or different links from transmitting messages in a same frequency hopping manner, that is, prevents a same frequency hopping channel from being frequently selected. Therefore, severe mutual-interference is avoided.

The clock parameter information is a clock parameter corresponding to a start moment of the second message, a clock parameter corresponding to the start moment of the transmission opportunity group, or a clock parameter corresponding to a start moment of a transmission opportunity. The clock parameter information includes a number or the like of a time resource unit such as a slot, subframe, or frame to which a moment belongs.

Optionally, each transmission opportunity in the transmission opportunity group includes a fourth resource.

In the foregoing implementation, a transmission opportunity includes a third resource and a fourth resource. In this way, duration of interaction between the first node and a second node that sends a request message may be minimized. Therefore, the second node may enter a low power state when no interaction is performed. This helps the second node save energy.

Optionally, the detecting a request message on the at least one third resource includes: receiving a first request message on a third resource in a first transmission opportunity. The method further includes: sending a first response message on a fourth resource in the first transmission opportunity, where the first response message indicates reception of the first request message.

In the foregoing implementation, the first node sends the first response message to notify the second node that the first request message is received. After sending the first request message, the second node determines, by receiving the first response message on the fourth resource in the same transmission opportunity, that the first request message is received by the first node. In this way, duration of interaction between the first node and the second node that sends the request message is minimized. Therefore, the second node may enter a low power state when no interaction is performed. This helps the second node save energy.

Optionally, the first request message includes an identifier of a first device, the first request message is from the first device, and the first response message includes the identifier of the first device.

In the foregoing implementation, both the first request message and the first response message include the identifier of the first device. To be specific, the first node obtains the identifier of the first device through the first request message, and sends the first response message that includes the identifier of the first device, to notify the first device that the first request message is received. Correspondingly, the first device sends the first request message that includes the identifier of the first device to the first node, and receives the first response message sent by the first node. The first device obtains the identifier of the first device through the first response message. Therefore, the first device determines that the first request message is received by the first node.

Optionally, the at least one third resource corresponds to at least one fourth resource, the at least one fourth resource is used to carry at least one response message, and the at least one response message corresponds to a request message from the at least one third resource.

The at least one fourth resource may be located behind all third resources, so that there is a large interval between a request message and a response message. This meets a usage requirement of a node that has a long processing delay, and is easy to be implemented by the node.

Optionally, the at least one third resource is in a one-to-one correspondence with the at least one fourth resource, or there is one fourth resource that is in the at least one fourth resource and that corresponds to a plurality of third resources.

That the at least one third resource is in a one-to-one correspondence with the at least one fourth resource may be: the at least one third resource is in a one-to-one correspondence with the at least one fourth resource in a time sequence.

In addition, one fourth resource corresponds to a plurality of third resources. In other words, one response message corresponds to a plurality of request messages. This reduces response message overheads, and helps improve resource utilization.

Optionally, the detecting a request message on the at least one third resource includes: receiving a first request message on a third resource. The method further includes: sending a first response message on a fourth resource corresponding to the third resource, where the first response message indicates reception of the first request message.

Optionally, the second message further indicates the at least one fourth resource.

The first node may configure a resource more flexibly and implement discovery/connection and another service, to multiplex a time domain resource more flexibly. Further, the first node may set an appropriate minimum interval between the third resource and the fourth resource based on a processing delay of the node, to adapt to devices having different processing capabilities.

Optionally, the second message indicates one or more of the following: at least one third resource is used to detect a discovery request message; at least one third resource is used to detect an access request message; or one of the at least one third resource corresponds to a second node, and the second message includes an identifier of the second node.

In the foregoing implementation, purposes or functions of different resources can be distinguished. In this case, a conflict can be reduced when a node selects one of a plurality of third resources to send a request message. In addition, a node that uses a third resource to send a request message may be specified, to prevent another node from using the resource. Therefore, a conflict is avoided.

According to a second aspect, this application provides a communication method. The method includes: receiving a first message from a first node on a first broadcast frequency hopping channel, where the first message indicates a first resource on a first frequency hopping channel; receiving a second message on the first resource, where the second message indicates a second resource, and the second resource includes at least one third resource; and sending a first request message on one of the at least one third resource, where the first request message includes a discovery request message and/or an access request message.

The foregoing method may be applied to a second node, and the second node needs to send a request message to the first node. The second node may be a primary node in an in-vehicle wireless communication scenario, for example, a cockpit domain controller (cockpit domain controller, CDC), a passive entry passive start (passive entry passive start, PEPS) system, or a mobile phone. The first node may alternatively be a base station, user equipment (user equipment, UE), or the like in a wide-area wireless communication system. The first node may alternatively be a base station, an access point (access point, AP), or the like in a local-area wireless communication system. The AP may be a wireless AP such as a wireless router, a wireless gateway, or a wireless bridge.

The first frequency hopping channel may be a common frequency hopping channel. The second message may be an extended broadcast message.

In a specific implementation, the first request message includes an identifier of the second node.

In the foregoing method, the second message may indicate at least one resource used to carry a request message, and the second node may select, from the at least one resource indicated by the second message, an appropriate resource to send the request message. This helps reduce a waiting delay of the second node in a high concurrency scenario, and improves communication efficiency between nodes.

It should be noted that, for beneficial effects of related content such as the second message, the third resource, and a fourth resource in the second aspect, refer to descriptions of beneficial effects of corresponding content in the first aspect. Details are not described herein.

Optionally, the second message includes information that indicates a quantity of third resources included in the second resource.

Optionally, the second resource further includes at least one fourth resource, the at least one fourth resource is used to carry at least one response message, and the at least one response message corresponds to a request message from the at least one third resource.

For example, the at least one third resource is in a one-to-one correspondence with the at least one fourth resource.

Optionally, the second resource is a transmission opportunity group, the transmission opportunity group includes at least one transmission opportunity, and each transmission opportunity includes a third resource.

Optionally, the second message further indicates a start moment of the at least one third resource or a start moment of the at least one transmission opportunity.

Optionally, the second message further includes one or more types of the following information: information about a time length of the transmission opportunity group; information about a start moment of the transmission opportunity group; information about a quantity of transmission opportunities in the transmission opportunity group; information about an interval between start moments of at least two adjacent transmission opportunities in the transmission opportunity group; information about a start moment of a first transmission opportunity in the transmission opportunity group; information about a frequency hopping channel of the transmission opportunity group or the at least one third resource; information about a hopping frequency of the transmission opportunity group or the at least one third resource; information about bandwidth of the transmission opportunity group or the at least one third resource; a frequency hopping random seed; information about an available frequency hopping channel; and clock parameter information.

Optionally, each transmission opportunity in the transmission opportunity group includes a fourth resource.

Optionally, the sending a first request message on one of the at least one third resource includes: sending the first request message on a third resource in a first transmission opportunity.

Optionally, the at least one third resource corresponds to at least one fourth resource, the at least one fourth resource is used to carry a response message, and the response message corresponds to a request message from the at least one third resource.

Optionally, the at least one third resource is in a one-to-one correspondence with the at least one fourth resource, or there is one fourth resource that is in the at least one fourth resource and that corresponds to a plurality of third resources.

Optionally, the second message further indicates the at least one fourth resource.

Optionally, after the sending a first request message on one of the at least one third resource, the method further includes: detecting a response message from the first node on a fourth resource, where the fourth resource corresponds to one of the at least one third resource.

In the foregoing implementation, the second node detects a response message on a fourth resource. Further, the second node may determine, based on the response message, whether the request message sent by the second node is successfully received by the first node.

Optionally, the second message indicates one or more of the following: at least one third resource is used to detect a discovery request message; at least one third resource is used to detect an access request message; or one of the at least one third resource corresponds to a second node, and the second message includes an identifier of the second node.

According to a third aspect, this application provides a communication apparatus. The apparatus includes: a sending unit, configured to send a first message on at least one broadcast frequency hopping channel, where the first message indicates a first resource on a first frequency hopping channel, and the sending unit is further configured to send a second message on the first resource, where the second message indicates a second resource, and the second resource includes at least one third resource; and a processing unit and/or a receiving unit, configured to detect a request message on the at least one third resource.

Optionally, the second message includes information that indicates a quantity of third resources included in the second resource.

Optionally, the second resource further includes at least one fourth resource, the at least one fourth resource is used to carry at least one response message, and the at least one response message corresponds to a request message from the at least one third resource.

Optionally, the second resource is a transmission opportunity group, the transmission opportunity group includes at least one transmission opportunity, and each transmission opportunity includes a third resource.

Optionally, the second message further indicates a start moment of the at least one third resource or a start moment of the at least one transmission opportunity.

Optionally, the second message further includes one or more types of the following information: information about a time length of the transmission opportunity group; information about a start moment of the transmission opportunity group; information about a quantity of transmission opportunities in the transmission opportunity group; information about an interval between start moments of at least two adjacent transmission opportunities in the transmission opportunity group; information about a start moment of a first transmission opportunity in the transmission opportunity group; information about a frequency hopping channel of the transmission opportunity group or the at least one third resource; information about a hopping frequency of the transmission opportunity group or the at least one third resource; information about bandwidth of the transmission opportunity group or the at least one third resource; a frequency hopping random seed; information about an available frequency hopping channel; and clock parameter information.

Optionally, each transmission opportunity in the transmission opportunity group includes a fourth resource.

Optionally, the processing unit and/or the receiving unit are/is specifically configured to receive a first request message on a third resource in the first transmission opportunity. The sending unit is further configured to send a first response message on a fourth resource in the first transmission opportunity, where the first response message indicates reception of the first request message.

Optionally, the first request message includes an identifier of a first device, the first request message is from the first device, and the first response message includes the identifier of the first device.

Optionally, the at least one third resource corresponds to at least one fourth resource, the at least one fourth resource is used to carry at least one response message, and the at least one response message corresponds to a request message from the at least one third resource.

Optionally, the at least one third resource is in a one-to-one correspondence with the at least one fourth resource, or there is one fourth resource that is in the at least one fourth resource and that corresponds to a plurality of third resources.

Optionally, the processing unit and/or the receiving unit are/is specifically configured to receive a first request message on a third resource. The sending unit is further configured to send a first response message on a fourth resource corresponding to the third resource, where the first response message indicates reception of the first request message.

Optionally, the second message further indicates the at least one fourth resource.

Optionally, the second message indicates one or more of the following: at least one third resource is used to detect a discovery request message; at least one third resource is used to detect an access request message; or one of the at least one third resource corresponds to a second node, and the second message includes an identifier of the second node.

According to a fourth aspect, this application provides a communication apparatus. The apparatus includes: a receiving unit, configured to receive a first message from a first node on a first broadcast frequency hopping channel, where the first message indicates a first resource on a first frequency hopping channel, and the receiving unit is further configured to receive a second message on the first resource, where the second message indicates a second resource, and the second resource includes at least one third resource; and a sending unit, configured to send a first request message on one of the at least one third resource, where the first request message includes a discovery request message and/or an access request message.

Optionally, the second message includes information that indicates a quantity of third resources included in the second resource.

Optionally, the second resource further includes at least one fourth resource, the fourth resource is used to carry a response message, and the response message corresponds to a request message from the at least one third resource.

Optionally, the second resource is a transmission opportunity group, the transmission opportunity group includes at least one transmission opportunity, and each transmission opportunity includes a third resource.

Optionally, the second message further indicates a start moment of the at least one third resource or a start moment of the at least one transmission opportunity.

Optionally, the second message further includes one or more types of the following information: information about a time length of the transmission opportunity group; information about a start moment of the transmission opportunity group; information about a quantity of transmission opportunities in the transmission opportunity group; information about an interval between start moments of at least two adjacent transmission opportunities in the transmission opportunity group; information about a start moment of a first transmission opportunity in the transmission opportunity group; information about a frequency hopping channel of the transmission opportunity group or the at least one third resource; information about a hopping frequency of the transmission opportunity group or the at least one third resource; information about bandwidth of the transmission opportunity group or the at least one third resource; a frequency hopping random seed; information about an available frequency hopping channel; and clock parameter information.

Optionally, each transmission opportunity in the transmission opportunity group includes a fourth resource.

Optionally, the sending unit is specifically configured to send the first request message on a third resource in the first transmission opportunity.

Optionally, the at least one third resource corresponds to at least one fourth resource, the at least one fourth resource is used to carry a response message, and the response message corresponds to a request message from the at least one third resource.

Optionally, the at least one third resource is in a one-to-one correspondence with the at least one fourth resource, or there is one fourth resource that is in the at least one fourth resource and that corresponds to a plurality of third resources.

Optionally, the second message further indicates the at least one fourth resource.

Optionally, after the first request message is sent on one of the at least one third resource, the receiving unit is further configured to detect a response message from the first node on a fourth resource, where the fourth resource corresponds to one of the at least one third resource.

Optionally, the second message indicates one or more of the following: at least one third resource is used to detect a discovery request message; at least one third resource is used to detect an access request message; or one of the at least one third resource corresponds to a second node, and the second message includes an identifier of the second node.

According to a fifth aspect, this application provides a communication apparatus. The apparatus includes at least one processor and a communication interface. The communication interface is configured to provide information input and/or output for the at least one processor. The apparatus may be a chip or an integrated circuit, or may be the apparatus according to the third aspect. The apparatus is configured to implement the method according to the first aspect or any one of the possible embodiments of the first aspect.

According to a sixth aspect, this application provides an apparatus. The apparatus includes at least one processor and a communication interface. The communication interface is configured to provide information input and/or output for the at least one processor. The apparatus may be a chip or an integrated circuit, or may be the apparatus according to the fourth aspect. The apparatus is configured to implement the method according to the second aspect or any one of the possible embodiments of the second aspect.

According to a seventh aspect, this application provides a computer-readable storage medium, including computer instructions. When the computer instructions are run on a processor, the method according to the first aspect or any one of the possible implementations of the first aspect is implemented.

According to an eighth aspect, this application provides a computer-readable storage medium, including computer instructions. When the computer instructions are run on a processor, the method according to the second aspect or any one of the possible implementations of the second aspect is implemented.

According to a ninth aspect, this application provides a computer program product. When the computer program product is run on a processor, the method according to the first aspect or any one of the possible embodiments of the first aspect is implemented. For example, the computer program product may be a software installation package. When the method provided in any one of the possible designs of the first aspect needs to be used, the computer program product may be downloaded and run on the processor, to implement the method according to the first aspect or any one of the possible embodiments of the first aspect.

According to a tenth aspect, this application provides a computer program product. When the computer program product is run on a processor, the method according to the second aspect or any one of the possible embodiments of the second aspect is implemented. The computer program product may be a software installation package. When the method provided in any one of the possible designs of the second aspect needs to be used, the computer program product may be downloaded and run on the processor, to implement the method according to the second aspect or any one of the possible embodiments of the second aspect.

According to an eleventh aspect, this application provides a communication system. The system includes a first apparatus and a second apparatus. The first apparatus is the apparatus according to the third aspect or the fifth aspect, or the apparatus according to any one of the possible implementations of the third aspect or the fifth aspect. The second apparatus is the apparatus according to the fourth aspect or the sixth aspect, or the apparatus according to any one of the possible implementations of the fourth aspect or the sixth aspect.

According to a twelfth aspect, this application provides a terminal. The terminal includes at least one of a first apparatus and a second apparatus. The first apparatus is the apparatus according to the third aspect or the fifth aspect, or the apparatus according to any one of the possible implementations of the third aspect or the fifth aspect. The second apparatus is the apparatus according to the fourth aspect or the sixth aspect, or the apparatus according to any one of the possible implementations of the fourth aspect or the sixth aspect. An example of the terminal includes but is not limited to: a smart household device (such as a television, a robotic vacuum cleaner, a smart desk lamp, an acoustic system, an intelligent lighting system, an electrical control system, home background music, a home theater system, an intercom system, or video surveillance), an intelligent transportation device (such as a car, a ship, an uncrewed aerial vehicle, a train, a van, or a truck), an intelligent manufacturing device (such as a robot, an industrial device, intelligent logistics, or an intelligent factory), or an intelligent terminal (such as a mobile phone, a computer, a tablet, a palmtop computer, a desktop computer, a headset, a speaker, a wearable device, a vehicle-mounted device, a virtual reality device, or an augmented reality device).

DESCRIPTION OF EMBODIMENTS

Figure 1:
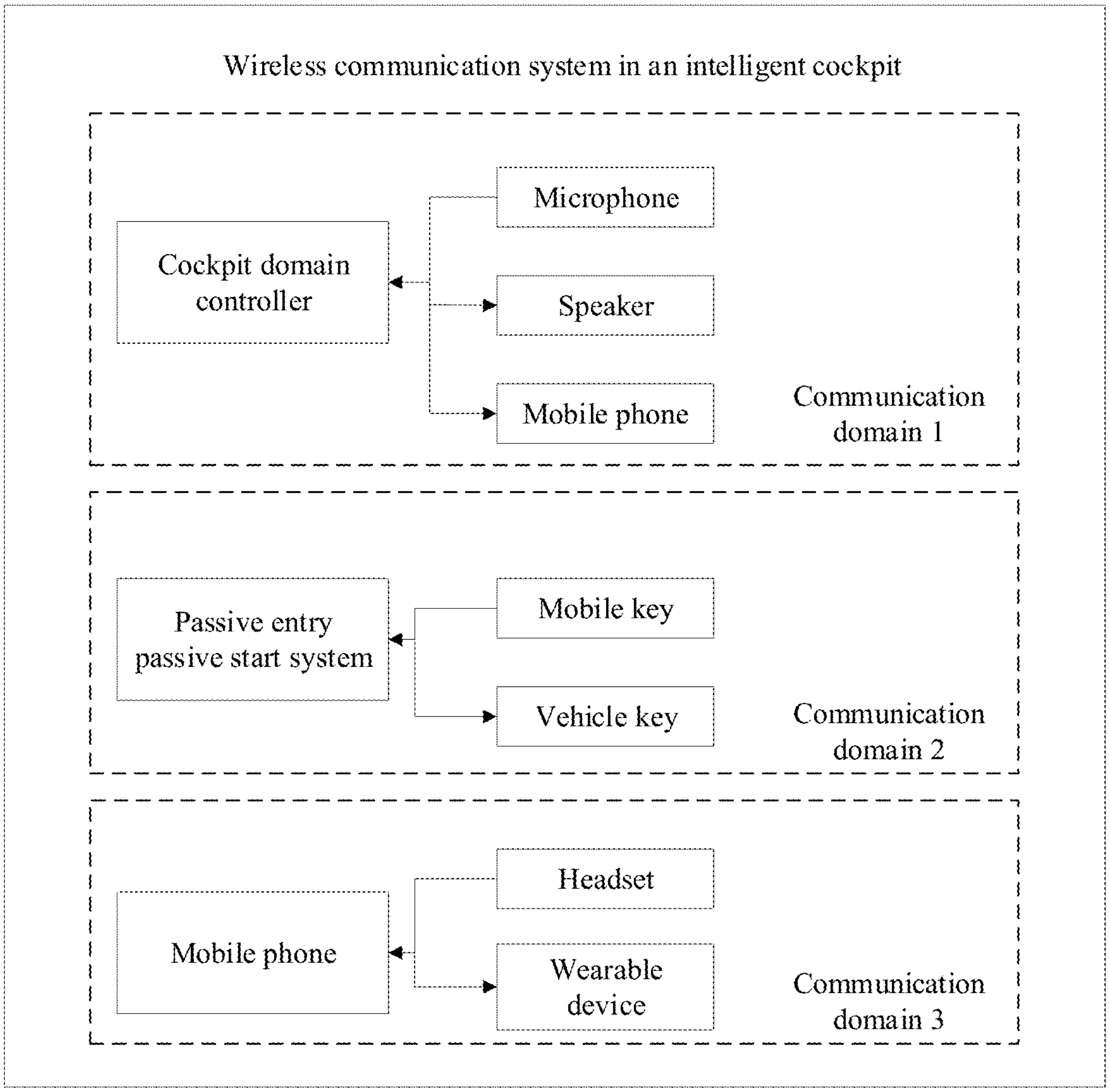
FIG. 1 is a schematic diagram of a wireless communication system in an intelligent cockpit.

The terms used in embodiments of this application are merely for illustrating specific embodiments, and are not intended to limit this application. In this specification and claims in embodiments of this application, the terms “first”, “second”, and the like are intended to distinguish between different objects but do not indicate a particular order of the objects.

For ease of understanding, the following first describes related terms that may be used in embodiments of this application.

(1) Transmission Opportunity Group and Transmission Opportunity

The transmission opportunity group is a segment of predefined or configured consecutive time resources (or a segment of resources that are consecutive in time domain) used for a specific transmission purpose or a specific communication link. One transmission opportunity group includes at least one transmission opportunity, and one transmission opportunity includes one or more resources used to transmit one or more messages. Transmission patterns of different transmission opportunities in one transmission opportunity group are the same. That transmission patterns of two different transmission opportunities are the same means that quantities of resources configured to transmit messages are the same in the two transmission opportunities. In a case in which each transmission opportunity includes a plurality of resources, functions of the resources in the transmission opportunity may be different, but resources with same functions in the two transmission opportunities are arranged in a same order. For example, a first resource in each of the two transmission opportunities is a configured resource used by a first node to receive a request message, and a second resource in each of the two transmission opportunities is a configured resource used by the first node to send a response message corresponding to the request message. Time lengths of resources that are used to transmit messages and that are in corresponding order in two different transmission opportunities with same transmission patterns may be the same or may be different. For example, lengths of first transmission resources in the two transmission opportunities may be the same or may be different.

(2) Frequency Hopping

Nodes communicate with each other by using a frequency hopping technology. A frequency band for communication can be divided into a plurality of frequency hopping channels, and each frequency hopping channel corresponds to a center frequency. The frequency hopping channel is sometimes also referred to as a hopping frequency. A frequency hopping channel is used by a node each time a message is sent and/or received, and no frequency hopping channel is changed in a process of sending and/or receiving one message. When a node sends and/or receives a plurality of messages, a frequency hopping channel to be used may vary with time, but it is not excluded that two messages may be transmitted through a same frequency hopping channel.

In a possible implementation, frequency hopping channels are classified into a common frequency hopping channel and a broadcast frequency hopping channel based on whether a message (which is also referred to as a connectionless transmission message) other than a broadcast message can be sent. For example, the broadcast frequency hopping channel is used to send only a broadcast message, and the common frequency hopping channel may be used to send a message other than the broadcast message.

Based on a frequency hopping random seed and a clock parameter corresponding to a resource for sending and/or receiving a message, a node may determine, through a predefined frequency hopping algorithm, a frequency hopping channel for sending and/or receiving the message.

The frequency hopping random seed is used for frequency hopping randomization between different devices (or nodes) or between different links, to prevent different devices (or nodes) or different links from transmitting messages in a same frequency hopping manner, that is, prevent a same frequency hopping channel from being frequently selected. Therefore, severe mutual-interference is avoided.

When sending and/or receiving a message, a node determines, based on a clock parameter, a frequency hopping channel to be used. In this way, the frequency hopping channel to be used varies with time when a plurality of messages are sent and/or received. The clock parameter is usually a predefined or configured clock parameter corresponding to a resource for sending and/or receiving a message. For example, the clock parameter is a predefined or configured clock parameter corresponding to a start moment of a transmission opportunity group used for sending and/or receiving the message. Alternatively, the clock parameter is a predefined or configured clock parameter corresponding to a start moment of a transmission opportunity used for sending and/or receiving the message. The clock parameter may be a value corresponding to time measured in a unit of microsecond, millisecond, or the like; or may be a number of a time domain resource unit such as a slot (slot), a subframe (Subframe), or a frame (frame).

In order to avoid a frequency hopping channel with poor transmission performance that is caused due to interference, channel frequency-selective fading, or the like, an adaptive frequency hopping technology is developed in frequency hopping communication. Compared with a conventional frequency hopping algorithm, a frequency hopping algorithm in the adaptive frequency hopping technology adds an available channel list as an input parameter. A frequency hopping channel obtained through this frequency hopping algorithm is included in the available frequency hopping channel list. The adaptive frequency hopping technology excludes the channel with poor transmission performance from the available frequency hopping channel list, which can improve overall transmission performance of frequency hopping communication.

(3) Discovery and Connection

In a wireless communication scenario, there may be at least one communication domain in a specific communication area or range. The communication domain is a system that includes a group of communication nodes having a communication relationship, and a communication connection relationship (that is, a communication link) between the communication nodes. One communication domain includes one primary communication node (which is briefly referred to as a primary node) and at least one secondary communication node (which is briefly referred to as a secondary node). The primary node manages a resource of the communication domain. The resource may be any one of a time domain resource, a frequency domain resource, and a time-frequency resource. The primary node further has a function of scheduling a resource for a communication link between communication nodes in the communication domain.

Refer to FIG. 1. FIG. 1 is a schematic diagram of a wireless communication system in an intelligent cockpit. In FIG. 1, the wireless communication system in the intelligent cockpit includes three communication domains: a communication domain 1, a communication domain 2, and a communication domain 3. The communication domain 1 includes a primary node, that is, a cockpit domain controller (cockpit domain controller, CDC), and secondary nodes, that is, a microphone, a speaker, and a mobile phone. The CDC may perform wireless communication with each of the microphone, the speaker, and the mobile phone. The communication domain 2 includes a primary node, that is, a passive entry passive start (passive entry passive start, PEPS) system, and secondary nodes, that is, a mobile key and a vehicle key. The PEPS system may perform wireless communication with each of the mobile key and the vehicle key. The communication domain 3 includes a primary node, that is, a mobile phone, and secondary nodes, that is, a headset and a wearable device. The mobile phone may perform wireless communication with each of the headset and the wearable device.

Before a communication domain is established, discovery and connection processes need to be performed between any two nodes in the communication domain.

Discovery refers to a process in which a node confirms existence of another node in a reachable range of a wireless signal and one or more pieces of the following information: a node type, an identifier, a provided or needed service, or the like. Specifically, a first node sends a broadcast message, and a second node scans the broadcast message to discover a broadcast node. This process is also referred to as a unidirectional discovery process. After the unidirectional discovery process is performed, the second node may send a discovery request message to the first node to exchange necessary information, such as a node identifier, or information about a service provided or needed by a node. In this way, a bidirectional discovery process is implemented. The discovery request message may also be referred to as a scan request message, a scan message, a discovery message, or the like.

Connection refers to a process in which two nodes establish a stable communication connection relationship by exchanging necessary information, such as node capability information, information about a service provided or needed by a node, or communication resource configuration information. For example, the first node sends a broadcast message. After detecting the corresponding broadcast message, the second node sends an access request message to the first node, to request to establish a stable communication connection relationship with the first node. In some communication systems, the discovery and connection processes are combined. For example, after the unidirectional discovery process is performed, the second node directly sends the access request message to the first node, to request to establish the stable communication connection relationship with the first node. The access request message may also be referred to as a connection request message, a connection message, an access message, or the like.

In the discovery and connection processes, the first node usually sends a corresponding response message after receiving the discovery request message or the access request message. In this way, after receiving the response message, the second node determines, based on the response message, whether the discovery request message or the access request message sent by the second node is received by the first node.

Generally, the CDC and the microphone are used as an example to describe processes of implementing discovery and access through broadcast. First, the CDC sequentially sends broadcast messages on all broadcast channels (such as a broadcast channel 1, a broadcast channel 2, and a broadcast channel 3). In order to reduce occupation of the broadcast channel and prevent congestion that is caused because a large quantity of nodes send messages on the channel, the broadcast message includes only a small amount of information, and other information may be carried by an extended broadcast message. The CDC sends the extended broadcast message on a common channel A (corresponding to a first hopping frequency) indicated by the broadcast message. The extended broadcast message may indicate a sending moment of a discovery request message or an access request message. It is assumed that the microphone detects the broadcast message on the broadcast channel 2. The microphone receives the extended broadcast message on the common channel A indicated by the broadcast message, and sends the discovery request message or the access request message to the CDC at a preset moment indicated by the extended broadcast message. After receiving the discovery request message or the access request message on the common channel A, the CDC sends a corresponding response message on the common channel A to notify the microphone that the discovery request message or the access request message is received.

However, in one broadcast period, discovery or access can be implemented between a maximum of one pair of devices (such as the CDC and the microphone). When discovery or access needs to be implemented between the CDC and each of a plurality of devices, each device needs to wait for a long time period. In addition, discovery/connection concurrency conditions on a node differ in different working environments. For example, in an initial power-on phase in a battery management system, a large quantity of communication nodes (usually dozens or even one or two hundred) of a battery cell or a battery module need to establish connections to a communication node of a battery management module. In addition, all these connections are expected to be rapidly established, so that a user does not wait for a long time period. However, in a normal running phase, only a small quantity of nodes that are occasionally and accidentally disconnected need to be reconnected. Therefore, how to minimize a waiting delay of a node and reduce a resource waste in different concurrency conditions is an urgent problem to be resolved.

In view of this, an embodiment of this application provides a communication method, so that a node can flexibly configure a quantity of resources for discovery/connection. This can effectively reduce a waiting delay in discovery/connection, and can satisfy a requirement for fast access in a high concurrency scenario. In addition, this may further reduce a resource waste in a low concurrency scenario.

Figure 2:
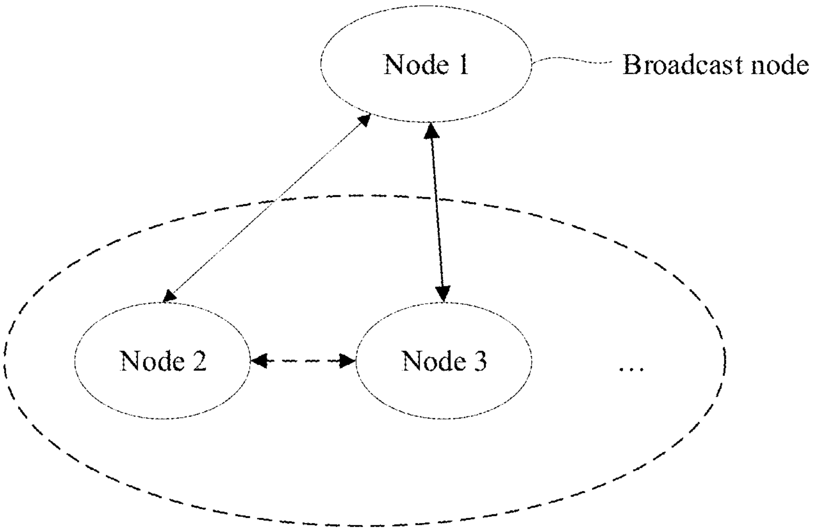
FIG. 2 is a schematic diagram of an architecture of a communication system according to this application.

Refer to FIG. 2. FIG. 2 is a diagram of an architecture of a communication system according to an embodiment of this application. The system may be used for discovery or access between nodes. The system includes at least two nodes, such as a node 1, a node 2, and a node 3. A communication link may be established between any two of the three nodes through discovery and access processes, to implement wireless communication between the two nodes.

A node is an electronic device having a communication capability, and is also referred to as a communication node. For example, the node may be an independent device such as a handheld terminal, a vehicle, a vehicle-mounted device, a network-side device, user equipment, an access terminal, a subscriber unit, a subscriber station, a mobile station, a mobile console, a remote station, a remote terminal, a base station, a wireless communication device (such as a wireless router, a wireless gateway, or a wireless bridge), a user agent, or a user apparatus. Alternatively, the node may be a component (such as a chip or an integrated circuit) included in the independent device. The node may be any possible intelligent terminal device (such as a mobile phone), an intelligent transportation device (such as a vehicle or an uncrewed aerial vehicle), an intelligent manufacturing device, a smart household device (such as a large screen or a speaker), or the like. In a possible scenario, the node may alternatively be a battery in a battery management system or in a battery pack in a vehicle.

For example, when the node is the in-vehicle device, the node may be a vehicle cockpit domain (cockpit domain) device, or a module in the vehicle cockpit domain device, for example, one or more of modules such as a cockpit domain controller, a camera, a screen, a microphone, a speaker, an electronic key, and a passive entry passive start system controller.

In a specific implementation, for example, the node 1 is the first node (which may also be referred to as a broadcast node), and the node 2 and the node 3 each may be the second node. The node 1 sends an extended broadcast message, where the extended broadcast message may indicate at least one resource, for example, indicate a quantity of resources. The extended broadcast message indicates the at least one resource. Therefore, after receiving the extended broadcast message, each of the node 2 and the node 3 may select, from the at least one resource, a resource used by the node to transmit a request message. Each of the node 2 and the node 3 sends the request message to the node 1 based on the selected resource. The request message may be the foregoing discovery request message or the foregoing access request message. Correspondingly, the node 1 may detect the request message on each resource indicated by the extended broadcast message. In some possible embodiments, if the node 1 detects a request message on a resource, the node 1 may send a corresponding response message based on a corresponding resource.

The node in embodiments of this application may be applied to a plurality of application scenarios, for example, the following application scenarios: mobile internet (mobile internet, MI), industrial control (industrial control), unmanned driving (self-driving), transportation safety (transportation safety), internet of things (internet of things, IOT), smart city (smart city), or smart home (smart home).

The node in this application may be applied to a plurality of communication systems. For example, the node may be applied to the following communication systems: a global system for mobile communication (global system for mobile communication, GSM), a code division multiple access (code division multiple access, CDMA) system, a wideband code division multiple access (wideband code division multiple access, WCDMA) system, a general packet radio service (general packet radio service, GPRS), a long term evolution (long term evolution, LTE) system, an LTE frequency division duplex (frequency division duplex, FDD) system, an LTE time division duplex (time division duplex, TDD) system, a universal mobile telecommunication system (universal mobile telecommunication system, UMTS), a worldwide interoperability for microwave access (worldwide interoperability for microwave access, WiMAX) communication system, a millimeter-wave communication system such as a 5th generation (5th generation, 5G) system or a new radio (New Radio, NR) system, a 6th generation (6th generation, 6G) system, various existing short-range communication systems (such as in-vehicle wireless communication systems), a future evolved short-range communication system, a universal short-range communication system, or the like.

In some application scenarios or for some network types, a device having a similar communication capability may not be referred to as a node. However, for ease of description, electronic devices having communication capabilities are collectively referred to as nodes in embodiments of this application.

The foregoing example descriptions of concepts may be applied in the following embodiments.

It should be noted that FIG. 2 is merely an example of an architectural diagram, and a quantity of network elements included in the communication system shown in FIG. 2 is not limited. In addition to the functional entities shown in FIG. 2, FIG. 2 may further include another functional entity, which is although not shown in FIG. 2. In addition, the method provided in embodiments of this application may be applied to the communication system shown in FIG. 2. Certainly, the method provided in embodiments of this application may alternatively be applied to another communication system. This is not limited in embodiments of this application.

Figure 3:
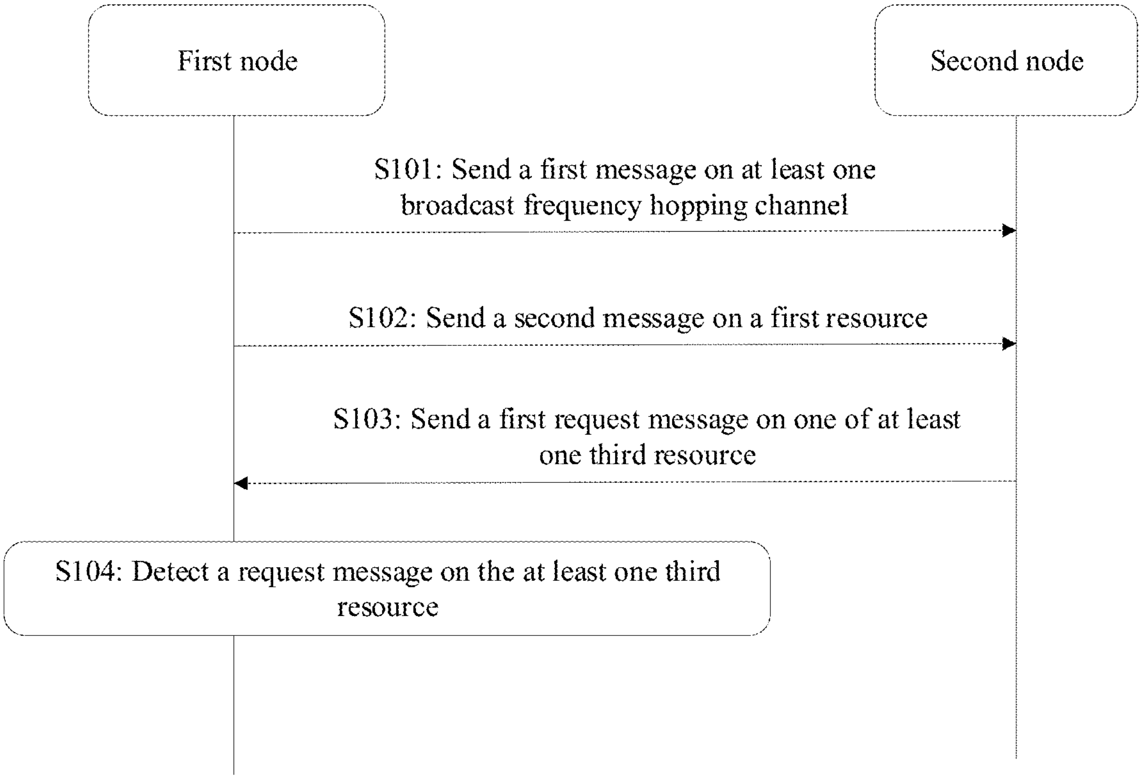
FIG. 3 is a flowchart of a communication method according to an embodiment of this application.

Refer to FIG. 3. FIG. 3 is a flowchart of a communication method according to an embodiment of this application. The communication method is applied to a communication system. The communication system includes a first node and a second node. The method includes but is not limited to the following steps.

S101: The first node sends a first message on at least one broadcast frequency hopping channel.

In this embodiment of this application, the first node sends the first message on the at least one broadcast frequency hopping channel. Correspondingly, the second node receives the first message from the first node on the first broadcast frequency hopping channel, where the first broadcast frequency hopping channel is one of the at least one broadcast frequency hopping channel.

In this embodiment of this application, the first message indicates a first resource on a first frequency hopping channel. The first frequency hopping channel may be a common frequency hopping channel.

In a specific implementation, the first resource may be a time domain resource, a frequency domain resource, or a time-frequency resource. This is not specifically limited herein.

In a specific implementation, the first frequency hopping channel is different from the at least one broadcast frequency hopping channel.

In a specific implementation, the first node sequentially sends the first message on each of the at least one broadcast frequency hopping channel.

S102: The first node sends a second message on the first resource.

In this embodiment of this application, the first node sends the second message on the first resource. Correspondingly, the second node receives the second message on the first resource.

In this embodiment of this application, the second message indicates a second resource, and the second resource includes at least one third resource.

In a specific implementation, the second message may be an extended broadcast message. A broadcast message is sent on a broadcast channel (or referred to as a broadcast frequency hopping channel). In order to reduce occupation of the broadcast channel and avoid congestion that is caused because a large quantity of nodes send messages on the broadcast channel, the extended broadcast message is sent on a resource of a common frequency hopping channel indicated by the broadcast message. In this way, the broadcast message may include only a small amount of information, and other information may be carried by the extended broadcast message. It may also be understood that the broadcast message and the extended broadcast message may be used together to carry information that needs to be broadcast.

For example, the second message may be sent in a broadcast or multicast manner.

In this embodiment of this application, the second message includes information that indicates a quantity of third resources included in the second resource.

In a specific implementation, the second resource may be determined by the first node. For example, the second resource may be determined by the first node based on a working environment. The working environment includes but is not limited to an application scenario, a working phase, or the like. The quantity of third resources included in the second resource is related to the working environment of the first node. For details of this embodiment, refer to a related description of S202 in an embodiment in FIG. 8. Details are not described herein.

In this embodiment of this application, the third resource may be a time domain resource or a time-frequency resource.

In a specific implementation, time lengths of the third resources in the second resource may be the same or may be different. This is not specifically limited in this embodiment of this application.

In a specific implementation, the third resource is used to carry a request message. The first node may detect the request message on the third resource. Specifically, the request message may be a discovery request message or an access request message. When the request message is the discovery request message, the request message is used to request the first node to determine reachability of a wireless signal between a sender of the request message and the first node. When the request message is the access request message, the request message is used to request the first node to establish a connection to the sender of the request message.

In some possible embodiments, the second resource is a segment of consecutive time domain resources or time resources. The second resource includes at least one resource group, and each resource group includes a third resource. In another specific implementation, the second resource further includes at least one fourth resource, where the fourth resource is used to carry a response message. In this case, each resource group further includes a fourth resource, and the resource group in the second resource includes a third resource and a fourth resource. Each resource in a resource group may be referred to as a child resource of the resource group. In other words, a third resource or a fourth resource may be referred to as a child resource of a resource group to which the third resource or the fourth resource belongs.

In this embodiment of this application, the second resource may be a transmission opportunity group, the transmission opportunity group includes at least one transmission opportunity, and each transmission opportunity includes a third resource.

The transmission opportunity group may also be referred to as a transmission group or a transmission resource group. Alternatively, the transmission opportunity group may be referred to as an event, or the like. The transmission opportunity group is a segment of consecutive time domain resources. For a description of the transmission opportunity group, refer to a related description in the foregoing embodiment.

The transmission opportunity group includes at least one transmission opportunity. The transmission opportunity may be briefly referred to as a transmission, and is used to provide an opportunity for information transmission between communication nodes. The transmission opportunity may alternatively be referred to as a sub-event. The transmission opportunity is a segment of time domain resources. One transmission opportunity may be used to carry one message (such as one request message) or a plurality of related messages (such as one request message and one response message). For a description of the transmission opportunity, refer to a related description in the foregoing embodiment.

It may be understood that, that a transmission opportunity includes a third resource means that the third resource is a resource in the transmission opportunity. When a transmission opportunity includes only one third resource, the third resource may alternatively be referred to as the transmission opportunity.

In this embodiment of this application, the second resource further includes at least one fourth resource. The at least one fourth resource is used to carry at least one response message, and the at least one response message corresponds to a request message from the at least one third resource. In a specific implementation, the at least one fourth resource of the may be in a one-to-one correspondence with the at least one third resource.

In this embodiment of this application, each transmission opportunity may further include a fourth resource. In other words, each transmission opportunity includes a third resource and a fourth resource. In this way, duration of interaction between the first node and the second node that sends a request message may be minimized. Therefore, the second node may enter a low power state when no interaction is performed. This helps the second node save energy.

In this embodiment of this application, the second message further includes one or more types of the following information: information about a time length of the transmission opportunity group; information about a start moment of the transmission opportunity group; information about a quantity of transmission opportunities in the transmission opportunity group; information about an interval between start moments of at least two adjacent transmission opportunities in the transmission opportunity group; information about a start moment of a first transmission opportunity in the transmission opportunity group; information about a frequency hopping channel of the transmission opportunity group or the at least one third resource; information about a hopping frequency of the transmission opportunity group or the at least one third resource; information about bandwidth of the transmission opportunity group or the at least one third resource; a frequency hopping random seed; information about an available frequency hopping channel; and clock parameter information.

The information about the time length of the transmission opportunity group indicates the time length of the transmission opportunity group. The time length of the transmission opportunity group is an interval between an end moment of a last transmission opportunity in the transmission opportunity group and a start moment of a first transmission opportunity in the transmission opportunity group.

The information about the start moment of the transmission opportunity group indicates the start moment of the transmission opportunity group. The start moment of the transmission opportunity group may be represented by an absolute moment or a time offset. For example, the time offset may be an offset of the start moment of the transmission opportunity group relative to a sending moment of the second message. It may be understood that, the start moment of the transmission opportunity group is indicated, so that a resource can be configured more flexibly and discovery/connection and another service can be implemented. Therefore, a time domain resource is multiplexed more flexibly. Further, an appropriate interval can be set based on a processing delay of a node, to adapt to devices having different processing capabilities.

The information about the quantity of transmission opportunities in the transmission opportunity group indicates the quantity of transmission opportunities included in the transmission opportunity group. In this embodiment of this application, if the second resource is a transmission opportunity group, a quantity of transmission opportunities in the transmission opportunity group equals a quantity of third resources in the second resource.

It is assumed that the information about the interval between the start moments of the at least two adjacent transmission opportunities in the transmission opportunity group is known. In this case, when a start moment of one of the transmission opportunities is known, a start moment of another transmission opportunity adjacent to the transmission opportunity may be obtained.

The information about the start moment of the first transmission opportunity in the transmission opportunity group indicates the start moment of the first transmission opportunity in the transmission opportunity group. The start moment of the first transmission opportunity in the transmission opportunity group may be the same as the start moment of the transmission opportunity group.

The information about the frequency hopping channel of the transmission opportunity group (or the at least one third resource) indicates the frequency hopping channel of the transmission opportunity group (or the at least one third resource).

In a specific implementation, if the frequency hopping channel of the transmission opportunity group (or the at least one third resource) is the same as the first frequency hopping channel, the information about the frequency hopping channel of the transmission opportunity group (or the at least one third resource) may be default. In other words, the frequency hopping channel of the transmission opportunity group (or the at least one third resource) is the same as the first frequency hopping channel by default. Interference conditions of a hopping frequency corresponding to a same frequency hopping channel are similar in a short time period. Therefore, transmission reliability of a request message can be improved if the frequency hopping channel of the transmission opportunity group (or the at least one third resource) is not changed.

In another specific implementation, if the frequency hopping channel of the transmission opportunity group (or the at least one third resource) is different from the first frequency hopping channel, that is, the frequency hopping channel of the transmission opportunity group (or the at least one third resource) is changed, the frequency hopping channel can be used more flexibly. In addition, this prevents a same frequency hopping channel from being occupied for an excessively long time period.

The information about the hopping frequency of the transmission opportunity group (or the at least one third resource) indicates the hopping frequency of the transmission opportunity group (or the at least one third resource). The hopping frequency of the transmission opportunity group (or the at least one third resource) is a center frequency of the frequency hopping channel of the transmission opportunity group (or the at least one third resource). Similarly, if the hopping frequency of the transmission opportunity group (or the at least one third resource) is the same as a hopping frequency corresponding to the first frequency hopping channel, transmission reliability of a request message can be improved. If the hopping frequency of the transmission opportunity group (or the at least one third resource) is different from the hopping frequency corresponding to the first frequency hopping channel, the hopping frequency can be used more flexibly.

The information about the bandwidth of the transmission opportunity group (or the at least one third resource) indicates the bandwidth of the transmission opportunity group (or the at least one third resource).

The frequency hopping random seed may be used to determine a frequency hopping channel of the transmission opportunity group (or the at least one third resource). The frequency hopping random seed enables frequency hopping randomization between different nodes or different links. This prevents a same frequency hopping manner from being used by different nodes to send messages or used by different links to transmit messages, and prevents a same frequency hopping channel from being frequently selected. Therefore, severe mutual-interference is avoided.

The information about the available frequency hopping channel indicates a frequency hopping channel available to the transmission opportunity group (or the at least one third resource).

The clock parameter information may be used to determine a frequency hopping channel of the transmission opportunity group (or the at least one third resource). For example, the clock parameter information is a clock parameter corresponding to a start moment of the second message, a clock parameter corresponding to the start moment of the transmission opportunity group, or a clock parameter corresponding to a start moment of a transmission opportunity. The clock parameter information includes a number or the like of a time resource unit such as a slot, subframe, or frame to which a moment belongs.

In this embodiment of this application, the second message further indicates a start moment of the at least one third resource or a start moment of the at least one transmission opportunity.

For example, the second message may include a start moment of each of the at least one third resource. Alternatively, the second message may include a start moment of each of the at least one transmission opportunity.

In a specific implementation, the start moment of the at least one third resource or the start moment of the at least one transmission opportunity may alternatively be predefined by a standard protocol.

In another specific implementation, the start moment of the at least one third resource or the start moment of the at least one transmission opportunity may alternatively be determined with reference to information predefined by a standard protocol and related information indicated by the second message. For example, it is assumed that the standard protocol defines an interval between any two transmission opportunities in a transmission opportunity group. Then, a start moment of each transmission opportunity in a transmission opportunity group may be obtained with reference to the information that is about the start moment of the transmission opportunity group and that is indicated by the second message or the information that is about the start moment of the first transmission opportunity in the transmission opportunity group and that is indicated by the second message.

Figure 4:
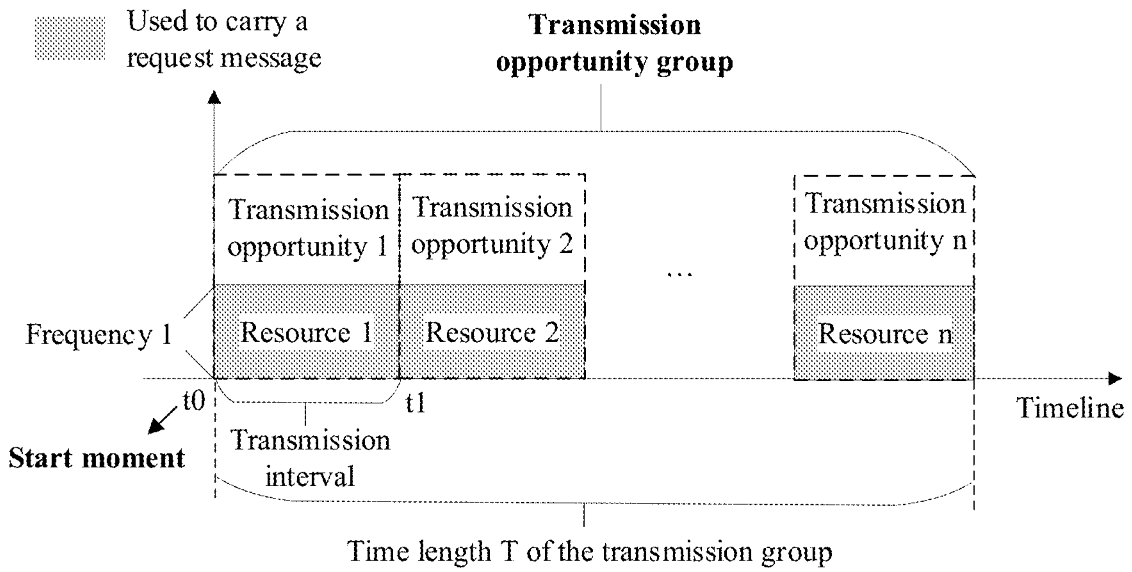
FIG. 4 is a schematic diagram of a transmission opportunity group according to an embodiment of this application.

Refer to FIG. 4. FIG. 4 is a schematic diagram of a transmission opportunity group according to an embodiment of this application. The transmission opportunity group includes only a plurality of third resources used to carry request messages, and each transmission opportunity includes one third resource.

In FIG. 4, the transmission opportunity group includes n time domain resources: a resource 1, a resource 2, . . . , and a resource n. Each of the resource 1, the resource 2, . . . , and the resource n may carry a request message. It may be understood that, in FIG. 4, the foregoing second resource includes the resource 1, the resource 2, . . . , and the resource n. Each of the resource 1, the resource 2, . . . , and the resource n is one of the third resources.

In FIG. 4, the transmission opportunity group includes n transmission opportunities (in other words, a quantity of transmission opportunities equals n): a transmission opportunity 1, a transmission opportunity 2, . . . , and a transmission opportunity n. Each transmission opportunity includes one resource. To be specific, the transmission opportunity 1 includes a resource 1, the transmission opportunity 2 includes a resource 2, . . . , and the transmission opportunity n includes a resource n. In other words, one transmission opportunity includes one third resource, that is, a quantity of transmission opportunities in the transmission opportunity group equals a quantity of third resources in the second resource.

In FIG. 4, a hopping frequency of the transmission opportunity group is a frequency 1, and a channel on which the frequency 1 is located may be the same as or different from the first frequency hopping channel corresponding to the second message. This is not specifically limited herein.

In FIG. 4, a moment t0 is a start moment of the transmission opportunity group, the transmission opportunity 1, or the resource 1.

In FIG. 4, an interval (which may alternatively be referred to as a transmission interval between the transmission opportunity 1 and the transmission opportunity 2) between the start moment of the transmission opportunity 1 and a start moment of the transmission opportunity 2 in the transmission opportunity group is represented by t1−t0. The moment t1 is later than the moment t0, the moment t1 is the start moment of the transmission opportunity 2 or a start moment of the resource 2, and the moment t1 is also an end moment of the resource 1 or the transmission opportunity 1. It can be learned that, in FIG. 4, all transmission opportunities have equal time lengths. Therefore, an interval between start moments of any two adjacent transmission opportunities in the transmission opportunity group may be represented by t1−t0. In addition, it can be learned from FIG. 4 that all resources also have equal time lengths, a time length of a transmission opportunity equals that of a resource in the transmission opportunity, and an end moment of a previous transmission opportunity is also a start moment of a next transmission opportunity.

In FIG. 4, a time length of the transmission opportunity group is represented by T, and may be an interval between an end moment of a last transmission opportunity (that is, the transmission opportunity n) in the transmission opportunity group and a start moment of a first transmission opportunity (that is, the transmission opportunity 1) in the transmission opportunity group.

It should be noted that FIG. 4 is merely an example of a transmission opportunity group that includes only a plurality of resources used to carry request messages. The transmission opportunity group that includes only a plurality of resources used to carrying request messages is not limited only to the transmission opportunity group shown in FIG. 4. In some possible embodiments, the time lengths of all transmission opportunities may alternatively be set to be unequal, there may alternatively be an interval between the end moment of the previous transmission opportunity and the start moment of the next transmission opportunity, a time length of a transmission opportunity may alternatively not equal a time length of a resource that is in the transmission opportunity and that is used to carry a request message, time lengths of resources in all transmission opportunities may alternatively be different, there may alternatively be an interval between an end moment of a previous resource and a start moment of a next resource, or the like. This is not specifically limited in this embodiment of this application.

Figure 5:
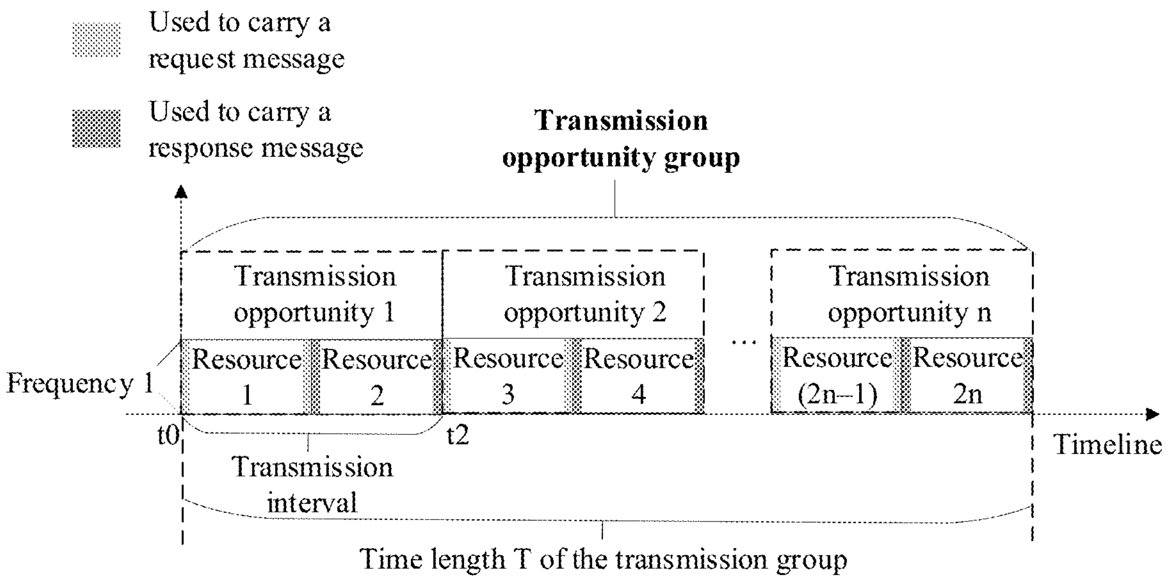
FIG. 5 is a schematic diagram of another transmission opportunity group according to an embodiment of this application.

Refer to FIG. 5. FIG. 5 is a schematic diagram of another transmission opportunity group according to an embodiment of this application. Compared with the transmission opportunity group shown in FIG. 4, the transmission opportunity group not only includes a plurality of third resources used to carry request messages, but also includes a plurality of fourth resources used to carry response messages. In addition, the plurality of fourth resources are in a one-to-one correspondence with the plurality of third resources. Each transmission opportunity includes one third resource and one fourth resource.

In FIG. 5, the transmission opportunity group includes 2*n* time domain resources: a resource 1, a resource 2, . . . , a resource 2*n*−1, and a resource 2*n*. Each of the resource 1, a resource 3, . . . , and the resource 2*n*−1 may be used to carry a request message, and each of the resource 2, a resource 4, . . . , and the resource 2*n* may be used to carry a response message. It may be understood that in FIG. 5, the foregoing second resource includes the resource 1, the resource 2, . . . , the resource 2*n*−1, and the resource 2*n*. Each of the resource 1, the resource 3, . . . , and the resource 2*n*−1 is one of the foregoing third resources, and each of the resource 2, the resource 4, . . . , and the resource 2*n* is one of the foregoing fourth resources.

In FIG. 5, the transmission opportunity group includes n transmission opportunities: a transmission opportunity 1, a transmission opportunity 2, . . . , and a transmission opportunity n. Each transmission opportunity includes two resources. For example, the transmission opportunity 1 includes the resource 1 and the resource 2, the transmission opportunity 2 includes the resource 3 and the resource 4, . . . , and the transmission opportunity n includes the resource 2*n*−1 and the resource 2*n*. In addition, one transmission opportunity includes one resource used to carry a request message and one resource used to carry a response message. It can be learned from FIG. 5 that a quantity of transmission opportunities equals a quantity of third resources in the transmission opportunity group.

The resource 1 and the resource 2 in the transmission opportunity 1 are used as an example. If the first node detects a request message on the resource 1 in the transmission opportunity 1, the first node sends a response message of the request message on the resource 2 in the transmission opportunity 1. The response message indicates reception of the request message on the resource 1 in the transmission opportunity 1.

In FIG. 5, a moment to is a start moment of the transmission opportunity group, and the moment t0 is also a start moment of the transmission opportunity 1 (that is, a first transmission opportunity in the transmission group) or the resource 1. If all transmission opportunities in the transmission opportunity group have equal time lengths, an interval (that is, a transmission interval) between start moments of any two adjacent transmission opportunities in the transmission opportunity group may be represented by t2−t0. The moment t2 is later than the moment t0. The moment t2 is a start moment of the transmission opportunity 2 or the resource 3, and the moment t2 is also an end moment of the transmission opportunity 1 or the resource 2. A time length of the transmission opportunity group is represented by T, and may be an interval between an end moment of a last transmission opportunity (that is, the transmission opportunity n) in the transmission opportunity group and the start moment of the first transmission opportunity (that is, the transmission opportunity 1) in the transmission opportunity group.

In FIG. 5, a hopping frequency of the transmission opportunity group is a frequency 1, and a channel on which the frequency 1 is located may be the same as or different from the first frequency hopping channel corresponding to the second message. This is not specifically limited herein.

It should be noted that FIG. 5 is merely an example of a transmission opportunity group that includes a plurality of resources used to carry request messages and a plurality of resources used to carry response messages. A transmission opportunity group that includes a resource used to carry a request message and a resource used to carry a response message is not limited only to the transmission opportunity group shown in FIG. 5. In some possible embodiments, the time lengths of all transmission opportunities may alternatively be set to be unequal, there may alternatively be an interval between an end moment of a previous transmission opportunity and a start moment of a next transmission opportunity, a sum of a time length of a resource used to carry a request message and a time length of a resource used to carry a response message in a transmission opportunity may alternatively be shorter than a time length of the transmission opportunity, time lengths of resources in a transmission opportunity may alternatively be different, there may alternatively be an interval between resources in a transmission opportunity, or the like. This is not specifically limited herein.

In some possible embodiments, at least one third resource corresponds to at least one fourth resource, the at least one fourth resource is used to carry a response message, and the response message corresponds to a request message from the at least one third resource.

In this embodiment of this application, the at least one third resource may be in a one-to-one correspondence with the at least one fourth resource, or there is one fourth resource that is in the at least one fourth resource and that corresponds to a plurality of third resources. It may be understood that one fourth resource corresponds to a plurality of third resources. In other words, one response message may respond to a plurality of request messages. This reduces response message overheads, and helps improve resource utilization.

In some possible embodiments, the second message may also indicate the at least one fourth resource. Therefore, the first node may configure a resource more flexibly and implement discovery/connection and another service, to multiplex a time domain resource more flexibly. Further, the first node may set an appropriate minimum interval between the third resource and the fourth resource based on a processing delay of the node, to adapt to devices having different processing capabilities.

In a specific implementation, a start moment of a first fourth resource in the at least one fourth resource is not earlier than an end moment of a last third resource in the at least one third resource. It may be understood that the at least one fourth resource is located behind all third resources, so that there is a large interval between a request message and a response message. This meets a usage requirement of a device that has a long processing delay, and is easy to be implemented by the device.

Figure 6:
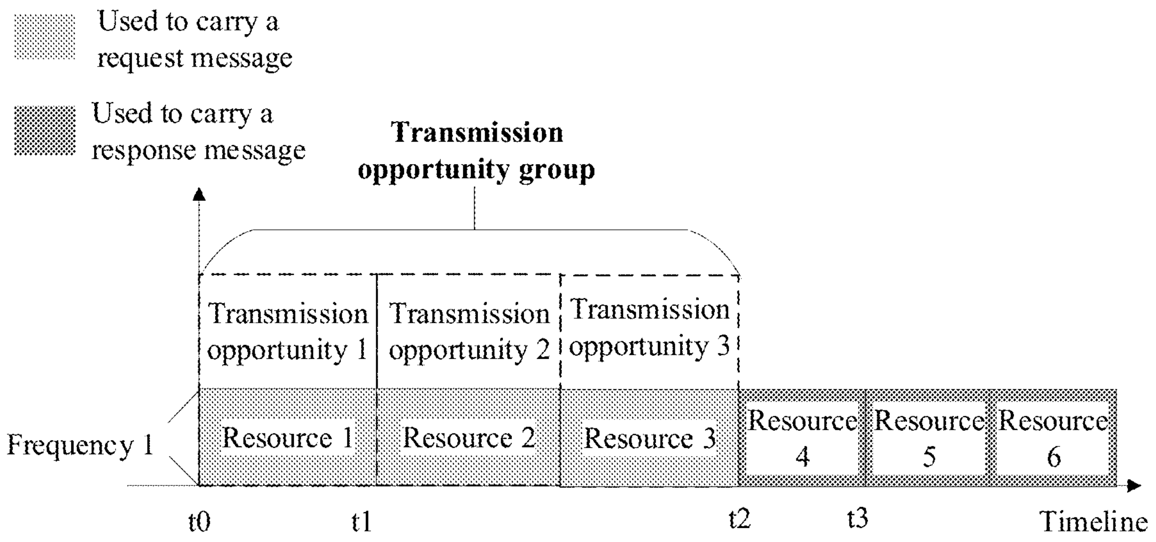
FIG. 6 is a schematic diagram of a resource according to an embodiment of this application.

Refer to FIG. 6. FIG. 6 is a schematic diagram of a resource according to an embodiment of this application. In FIG. 6, a transmission opportunity group includes only a plurality of third resources used to carry request messages, and a plurality of fourth resources are independent of the transmission opportunity group. In addition, the plurality of third resources are in a one-to-one correspondence with the plurality of fourth resources.

In FIG. 6, the transmission opportunity group includes three resources: a resource 1, a resource 2, and a resource 3. Each of the resource 1, the resource 2, and the resource 3 may be used to carry a request message. It may be understood that, in FIG. 6, the foregoing second resource includes the resource 1, the resource 2, and the resource 3. In this case, the second resource is the transmission opportunity group. In addition, each of the resource 1, the resource 2, and the resource 3 is one of the foregoing third resources.

In FIG. 6, there is further a resource 4, a resource 5, and a resource 6 behind the resource 3. Each of the resource 4, the resource 5, and the resource 6 may be used to carry a response message. The resource 1 may correspond to the resource 4, the resource 2 may correspond to the resource 5, and the resource 3 may correspond to the resource 6. It may be understood that each of the resource 4, the resource 5, and the resource 6 is one of the foregoing fourth resources. In other words, the plurality of fourth resources are in a one-to-one correspondence with the plurality of third resources.

That the resource 1 corresponds to the resource 4 in FIG. 6 is used as an example. If the first node detects a request message on the resource 4, the first node sends a response message of the request message on the resource 4, where the response message indicates reception of the request message on the resource 1.

In FIG. 6, it is assumed that an interval between start moments of any two adjacent third resources is equal. The interval between start moments of any two adjacent third resources in the transmission opportunity group is represented by t1−t0. The moment to is earlier than the moment t1, and the moment to is a start moment of the resource 1 or a transmission opportunity 1. The moment t1 is a start moment of the resource 2 or a transmission opportunity 2, and the moment t1 is also an end moment of the resource 1 or the transmission opportunity 1. It is assumed that an interval between start moments of any two adjacent fourth resources is equal and is represented by t3−t2. The moment t2 is earlier than the moment t3, the moment t2 is a start moment of the resource 4, and the moment t2 is also an end moment of the resource 3 or a transmission opportunity 3. The moment t3 is a start moment of the resource 5, and the moment t3 is also an end moment of the resource 4.

In FIG. 6, a frequency 1 is not only a hopping frequency of the transmission opportunity group, but also a hopping frequency of at least one fourth resource. A channel on which the frequency 1 is located may be the same as or different from the first frequency hopping channel corresponding to the second message. This is not specifically limited herein.

It should be noted that FIG. 6 is merely an example resource, and an arrangement setting of the plurality of third resources and the plurality of fourth resources is not limited only to a form shown in FIG. 6 in this embodiment of this application. In this embodiment of this application, a quantity of third resources is also limited only to 3, and a quantity of fourth resources is also limited only to 3. In some possible embodiments, for a possible variant of the third resource in the transmission opportunity group, refer to a related description in the embodiment in FIG. 4. Details are not described herein. For the fourth resources (that is, resources used to carry response messages) shown in FIG. 6, time lengths of the fourth resources may be unequal, there may be an interval between two adjacent fourth resources, or the like. This is not specifically limited in this embodiment of this application.

Figure 7A:
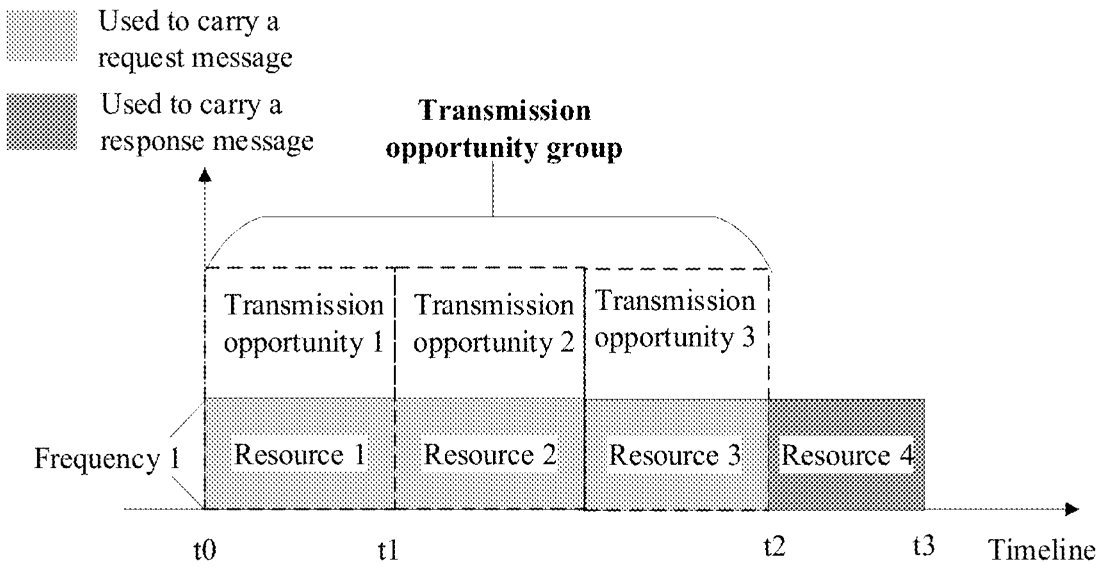
FIG. 7A is a schematic diagram of another resource according to an embodiment of this application.

Refer to FIG. 7A. FIG. 7A is a schematic diagram of another resource according to an embodiment of this application. A difference between FIG. 6 and FIG. 7A lies in: in FIG. 7A, a quantity of resources used to carry response messages is less than a quantity of resources used to carry request messages. In FIG. 7A, there are three third resources and one fourth resource. The three third resources are a resource 1, a resource 2, and a resource 3, and the fourth resource is a resource 4. The resource 4 corresponds to each of the resource 1, the resource 2, and the resource 3. In other words, one fourth resource corresponds to three third resources. When the first node detects a request message on each of the resource 1, the resource 2, and the resource 3, the first node sends a response message on the resource 4. The response message may indicate a resource on which the detected request message is located and indicate reception of the request message.

It should be noted that FIG. 7A is merely an example resource, and the resource setting shown in FIG. 7A may alternatively be in another form. This is not specifically limited in this embodiment of this application.

Figure 7B:
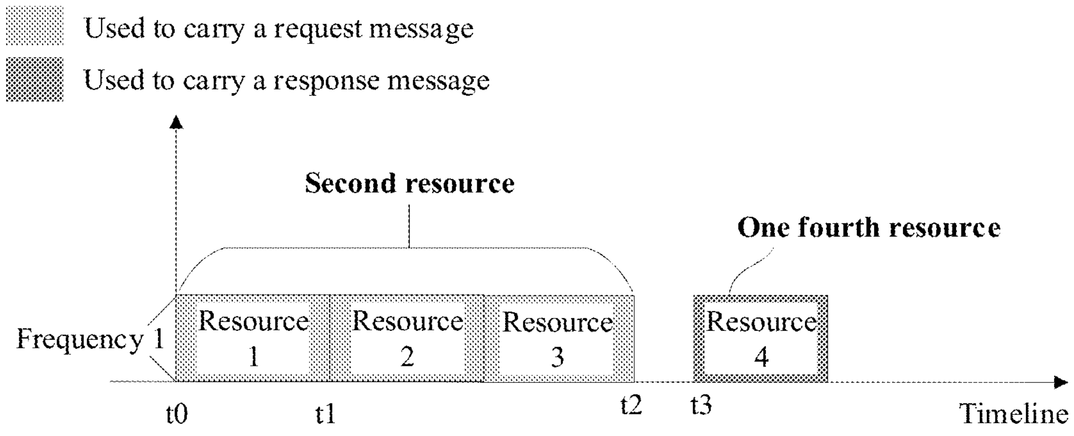
FIG. 7B is a schematic diagram of still another resource according to an embodiment of this application.

Refer to FIG. 7B. FIG. 7B is a schematic diagram of still another resource according to an embodiment of this application. The resource shown in FIG. 7B includes one second resource and one fourth resource. Specifically, the second resource includes a resource 1, a resource 2, and a resource 3. Each of the resource 1, the resource 2, and the resource 3 may be used to carry a request message. Therefore, each of the resource 1, the resource 2, and the resource 3 is one of the foregoing third resources. The fourth resource is a resource 4, where the resource 4 is used to carry a response message.

In FIG. 7B, a time length of the second resource is represented by t1−t0, and the second resource is a segment of consecutive time resources. The moment to is a start moment of the second resource, and the moment to is also a start moment of a first third resource (that is, the resource 1) in the second resource. The moment t1 is an end moment of the resource 1, and the moment t1 is a start moment of the resource 2. A moment t2 is an end moment of the resource 3 or an end moment of the second resource. A moment t3 is a start moment of the resource 4, and the moment t3 is later than the moment t2. In other words, there is an interval between the start moment of the resource 4 and the end moment of the resource 3.

It may be understood that if the first node detects a request message on the resource 1 in the second resource, the first node may send a corresponding response message on the resource 4 corresponding to the resource 1, to indicate reception of the request message on the resource 1.

In FIG. 7B, a frequency 1 is not only a hopping frequency of the second resource, but also a hopping frequency of the fourth resource. A channel on which the frequency 1 is located may be the same as or different from the first frequency hopping channel corresponding to the second message. This is not specifically limited herein.

It should be noted that a quantity of fourth resources in FIG. 7B is not limited to 1 in this embodiment of this application. In some possible embodiments, there may be a plurality of fourth resources behind the resource 4 in FIG. 7B, and a time length of each fourth resource and an interval between any two adjacent fourth resources are also not specifically limited.

It should be noted that FIG. 7B is merely an example resource, and the resource setting shown in FIG. 7B may alternatively be in another form. This is not specifically limited in this embodiment of this application.

In this embodiment of this application, the second message may further indicate one or more of the following: at least one third resource is used to detect a discovery request message; at least one third resource is used to detect an access request message; or one of the at least one third resource corresponds to a second node, and the second message includes an identifier of the second node. It may be understood that the second node is a specified node. In this way, purposes or functions of different resources can be distinguished. In this case, a conflict can be reduced when a node selects one of a plurality of third resources to send a request message. In addition, a node that uses a third resource to send a request message may be specified, to prevent another node from using the resource. Therefore, a conflict is avoided.

In a specific implementation, a flag bit may be used to indicate a purpose or a function of a corresponding resource. When a value of the flag bit is a first value, it indicates that the resource is used to detect the discovery request message. When the value of the flag bit is a second value, it indicates that the resource is used to detect the access request message. When the value of the flag bit is a third value, it indicates that the resource is used by the second node. When the value of the flag bit is a fourth value, it indicates that the resource is used to detect a discovery request message sent by the second node. When the value of the flag bit is a fifth value, it indicates that the resource is used to detect an access request message sent by the second node. When the value of the flag bit is a sixth value, it indicates that the resource may be used to detect both the discovery request message and the access request message. When the value of the flag bit is a seventh value, it indicates that the purpose of the resource is not limited. In addition, the value of the flag bit may alternatively be another value to indicate another purpose of the resource. This is not specifically limited in this embodiment of this application.

In another specific implementation, the flag bit may alternatively be represented by using a bit. For example, a first bit is used to indicate whether the resource corresponds to the second node, a second bit is used to indicate whether the resource is used to detect the discovery request message, and a third bit is used to indicate whether the resource is used to detect the access request message. For example, 100 indicates that the resource corresponds to the second node, 010 indicates that the resource is used to detect the discovery request message, and 001 indicates that the resource is used to detect the access request message. Then, 011 indicates that the resource may be used to detect both the discovery request message and the access request message, 101 indicates that the resource is used to detect the access request message sent by the second node, and 110 indicates that the resource is used to detect the discovery request message sent by the second node.

Refer to Table 1. Table 1 provides an example of a mapping table between a resource in a transmission group and a purpose. It is assumed that both communication parties agree in advance that the flag bit is represented in the foregoing bit manner. It can be learned from Table 1 that, flag field of a resource 1 takes a value of 101, which indicates that the resource 1 is used to detect the access request message sent by the second node, and a device identifier of the second node is A; flag field of a resource 2 takes a value of 010, which indicates that the resource 2 is used to detect the discovery request message; flag field of a resource 3 takes a value of 010, which indicates that the resource 3 is used to detect the discovery request message; . . . ; and flag field of a resource n takes a value of 001, which indicates that the resource n is used to detect the access request message.

TABLE 1

| Resource number | Flag field value (used to represent a purpose) | Device identifier |
|---|---|---|
| Resource 1 | 101 | A |
| Resource 2 | 010 | — |
| Resource 3 | 010 | — |
| . . . | . . . | . . . |
| Resource n | 001 | — |

In some possible embodiments, the mapping table shown in Table 1 may alternatively be represented in a form shown in Table 2. It can be learned that the flag bits of the resource 2 in Table 1 and the flag bits of the resource 3 in Table 1 are the same, and therefore can be combined in Table 2. To be specific, the flag bits 010 may indicate that both the resource 2 and the resource 3 can be used to detect the discovery request message. For a specific mapping relationship between another resource and flag bits in Table 2, refer to a related description in Table 1. Details are not described herein.

TABLE 2

| Resource number | Flag field value | Device identifier |
|---|---|---|
| Resource 1 | 101 | A |
| Resource 2 | 010 | — |
| Resource 3 | | |
| . . . | . . . | . . . |
| Resource n | 001 | — |

It may be understood that Table 1 and Table 2 are merely examples used to reflect a correspondence between a resource and flag bits, or a correspondence among a resource, flag bits, and a device identifier. In actual application, text content and a storage manner of the correspondence may alternatively be in another form. This is not specifically limited herein.

S103: The second node sends a first request message to the first node on one of the at least one third resource.

In this embodiment of this application, the second node receives the second message from the first node, selects a third resource from the at least one third resource based on the second message, and sends the first request message to the first node based on the resource.

In a specific implementation, when the first request message is the discovery request message, the third resource selected by the second node needs to meet any one of the following conditions:

(1) that the third resource is used to detect the discovery request message;

(2) that the third resource corresponds to the second node, that is, the second message indicates a mapping relationship between an identifier of the third resource and the device identifier of the second node;

(3) that the third resource is used to detect the discovery request message sent by the second node; or (4) that the third resource may be used to detect both the discovery request message and the access request message.

It should be noted that, in addition to the four conditions listed above, there may be another condition, for example, no limitation is imposed on the third resource selected by the second node. This is not specifically limited in this embodiment of this application.

In a specific implementation, when the first request message is the access request message, the third resource selected by the second node needs to meet any one of the following conditions:

(1) that the third resource is used to detect the access request message;

(2) that the third resource corresponds to the second node, that is, the second message indicates a mapping relationship between an identifier of the third resource and the device identifier of the second node;

(3) that the third resource is used to detect the access request message sent by the second node; or (4) that the third resource may be used to detect both the discovery request message and the access request message.

It should be noted that, in addition to the four conditions listed above, there may be another condition, for example, no limitation is imposed on the third resource selected by the second node. This is not specifically limited in this embodiment of this application.

In this embodiment of this application, that the second node sends the first request message to the first node on one of the at least one third resource may be: the second node sends the first request message to the first node on a third resource in the first transmission opportunity.

FIG. 5 is used as an example. It is assumed that the second node receives the second message from the first node. The second node selects the resource 3 in the transmission opportunity 2, and sends the first request message to the first node on the resource 3. Specifically, the second node sends the first request message at the start moment of the resource 3.

FIG. 6 is used as an example. It is assumed that the second node receives the second message from the first node. The second node selects the resource 2 in the transmission opportunity 2, and sends the first request message to the first node on the resource 2. Specifically, the second node sends the first request message at the start moment of the resource 2.

S104: The first node detects a request message on the at least one third resource.

In this embodiment of this application, that the first node detects a request message on the at least one third resource may be: the first node receives the first request message on a third resource in the first transmission opportunity. In this case, the first node may further send a first response message on a fourth resource in the first transmission opportunity, where the first response message indicates reception of the first request message.

FIG. 5 is used as an example. It is assumed that the first node receives the first request message on the resource 3 in the transmission opportunity 2. The first node sends the first response message on the resource 4 in the transmission opportunity 2, where the first response message indicates reception of the first request message on the resource 3.

In this embodiment of this application, that the first node detects a request message on the at least one third resource may be: the first request message is received on a third resource. In this case, the first node may further send the first response message on a fourth resource corresponding to the third resource, where the first response message indicates reception of the first request message.

FIG. 6 is used as an example. It is assumed that the first node receives the first request message on the resource 2. The resource 4 corresponds to the resource 2. Therefore, the first node sends the first response message on the resource 4, where the first response message indicates reception of the first request message on the resource 2.

FIG. 7A is used as an example. It is assumed that the first node receives the first request message on the resource 1. The resource 4 corresponds to the resource 1. Therefore, the first node sends the first response message on the resource 4, where the first response message includes information indicating reception of the first request message on the resource 1.

In a specific implementation, it is assumed that a quantity of fourth resources is less than a quantity of third resources, the quantity of third resources is L, and the quantity of fourth resources is M, where both L and M are positive integers, and L is greater than M. In this case, when the first node detects the first request message on a $p^{th}$ third resource, the first node may send a response message on a $q^{th}$ fourth resource, where the response message includes information indicating that the first request message on the $p^{th}$ third resource is received. p is a positive integer less than or equal to L, q is a positive integer less than or equal to M, and a relationship between p and q may meet the following formula (1). Certainly, the formula (1) may alternatively be changed into another form. This is not specifically limited herein.

$$q = \left\lceil \frac{p * M}{L} \right\rceil \quad \text{Formula (1)}$$

q may be a rounded-up value obtained by dividing a product of p and M by L.

For example, it is assumed that the quantity of third resources is 8, the quantity of fourth resources is 3, and the first node receives the first request message on a sixth third resource. Based on the formula (1), it can be obtained that q equals 3. To be specific, the sixth third resource corresponds to a third fourth resource. Therefore, the first node sends the response message on the third fourth resource.

For another example, it is assumed that the quantity of third resources is 8, and the quantity of fourth resources is 3. It is preset that a first fourth resource corresponds to first three third resources in eight third resources, a second fourth resource corresponds to a fourth, a fifth, and a sixth third resource in the eight third resources, and a third fourth resource corresponds to a seventh and an eighth third resource in the eight third resources. In this case, if the first node receives the first request message on the sixth third resource, the first node sends the response message on the second fourth resource.

It should be noted that when each node sends a corresponding request message on a third resource selected from the at least one third resource, a plurality of nodes may select a same third resource, that is, there are a plurality of request messages on the same third resource. This is because a node cannot know a third resource selected by another node. In this case, the plurality of request messages on the same third resource conflict. Consequently, the first node may correctly receive only one of the request messages on the third resource, or cannot correctly receive any request message on the third resource. In addition, if a third resource is not selected by any node, that is, no node sends a request message on the third resource, the first node detects no request message on the third resource.

It can be learned that, in this embodiment of this application, the first node may configure a quantity of resources used to transmit request messages, and indicate, through information carried in the extended broadcast message, a plurality of resources that may be used to carry request messages, so that a plurality of nodes can select resources. Further, the extended broadcast message helps the plurality of nodes select appropriate resources more accurately. In this way, each node can be fast connected to the first node in a high concurrency scenario, and a resource waste in a low concurrency scenario can be effectively reduced.

Figure 8:
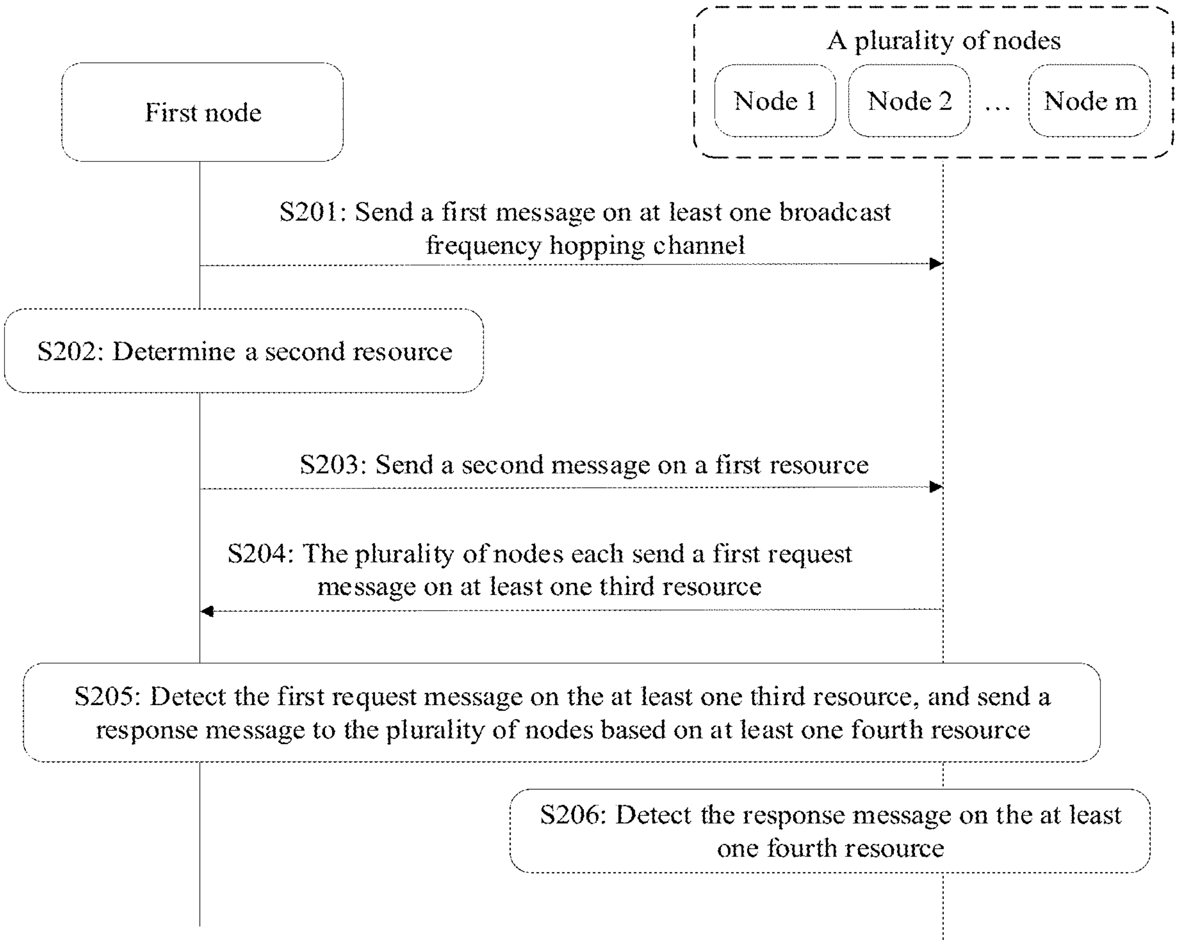
FIG. 8 is a flowchart of another communication method according to an embodiment of this application.

Refer to FIG. 8. FIG. 8 shows another communication method according to an embodiment of this application. In contrast to the embodiment in FIG. 3, there are a plurality of nodes that receive related messages from a first node. For example, the plurality of nodes include a node 1, a node 2, . . . , and a node m. The embodiment in FIG. 8 may be independent of the embodiment in FIG. 3. The method includes but is not limited to the following steps.

S201: The first node sends a first message on at least one broadcast frequency hopping channel. For details of this step, refer to a related description of S101 in the embodiment in FIG. 3. Details are not described herein.

S202: The first node determines a second resource.

For details of the second resource, refer to a related description of S102 in the embodiment in FIG. 3. Details are not described herein.

In this embodiment of this application, that the first node determines a second resource is specifically that the first node determines the second resource based on a working environment. The working environment includes at least one of a working scenario, a working phase, and the like. The working scenario may be, for example, a battery management scenario that is based on wireless communication, a cockpit domain controller control scenario that is based on wireless communication, a household device control scenario that is based on wireless communication, or a transportation team management scenario that is based on wireless communication. The working phase includes a startup phase, a running phase, a termination phase, or the like.

Concurrency of request messages on the first node differs in different working environments. The concurrency of request messages may be measured by a quantity of request messages. A larger quantity of request messages indicates higher concurrency of request messages on the first node. In other words, different working environments indicate different quantities of request messages corresponding to the working environments. For example, a quantity of request messages corresponding to the battery management scenario is larger than a quantity of request messages corresponding to the cockpit domain controller control scenario. For another example, a quantity of request messages corresponding to the startup phase is larger than a quantity of request messages corresponding to the running phase, and the quantity of request messages corresponding to the running phase is larger than a quantity of request messages corresponding to the termination phase.

In a specific implementation, when estimating that a quantity of request messages corresponding to a working environment is greater than a preset threshold, the first node may set a quantity of third resources in the configured second resource as a first threshold. When estimating that the quantity of request messages corresponding to the working environment is less than or equal to the preset threshold, the first node may set the quantity of third resources in the configured second resource as a second threshold. The second threshold is less than the first threshold. It can be learned that, the first node may flexibly configure a quantity of third resources (that is, resources used to carry request messages) based on different working environments in which the first node is located. In other words, when a plurality of nodes send request messages, a large quantity of resources may be configured for the plurality of nodes to use. When a small quantity of nodes send request messages, a small quantity of resources may be configured, to reduce resource consumption.

In another specific implementation, the first node may determine the second resource based on historical data of the working environment. The historical data includes at least one of parameters such as an average quantity, a maximum quantity, and a minimum quantity of corresponding request messages in the working environment in a historical time period. The first node may properly configure, based on the historical data of the working environment, a quantity of third resources included in the second resource.

A battery management system (Battery Management System, BMS) is used as an example. In an initial power-on phase, a management node of a battery management module estimates that a large quantity of nodes need to be connected to the management node. In this case, the management node of the battery management module may configure a large quantity of resources for node discovery/connection. In a running phase, the management node of the battery management module detects that only one or two nodes are offline and need to be reconnected. In this case, the management node of the battery management module configures a small quantity of resources, such as two resources, for node discovery/connection.

It should be noted that S202 may be performed after S201. In some possible embodiments, S202 may alternatively be performed before S201. An execution sequence of S201 and S202 is not specifically limited in this embodiment of this application.

S203: The first node sends a second message to each of the plurality of nodes on a first resource.

In a specific implementation, the first node may send the second message in a broadcast or multicast manner. For example, the first node sends one second message to each of the plurality of nodes on the first resource. Correspondingly, the plurality of nodes each may receive the second message on the first resource.

It should be noted that for a specific description of the second message, refer to a related description of S102 in the embodiment in FIG. 3. Details are not described herein.

S204: The plurality of nodes each send a first request message to the first node on at least one third resource.

In this embodiment of this application, each of the plurality of nodes receives the second message from the first node. Each node may select a third resource from the at least one third resource, and each node sends the first request message to the first node based on the third resource selected by the node. In other words, each of the plurality of nodes needs to send a request message to the first node.

It should be noted that, for a specific process of selecting the third resource by each node, refer to a related description of S103 in the embodiment in FIG. 3. Details are not described herein.

For example, the node 1 and the node 2 in the plurality of nodes are used as an example for description based on FIG. 5. Each of the node 1 and the node 2 receives the second message. In FIG. 5, the node 1 selects a resource 1 from a plurality of third resources, and the node 2 selects a resource 3 from the plurality of third resources. In this case, the node 1 sends a request message 1 to the first node based on the resource 1. Specifically, the node 1 sends, at a start moment to of the resource 1, the request message 1 to the first node on a channel on which a frequency 1 is located. The node 2 sends a request message 2 to the first node based on the resource 3. Specifically, the node 2 sends, at a start moment t2 of the resource 3, the request message 2 to the first node on the channel on which the frequency 1 is located. It should be noted that the request message 1 or the request message 2 may be a discovery request message or an access request message.

In some possible embodiments, some third resources are not limited to be used by a specific node, or request messages carried by some third resources are not limited to be of a specific type (for example, not limited to discovery request messages and access request messages). A node does not sense a third resource selected by another node. Therefore, a plurality of nodes may select a same third resource. For example, the node 1, the node 2, and the node 3 in the plurality of nodes are used as an example for description based on FIG. 6. Each of the node 1, the node 2, and the node 3 receives the second message from the first node. In FIG. 6, the node 1 selects a resource 1 from a plurality of third resources, and sends a request message 1 on the resource 1. The node 2 selects the resource 1 from the plurality of third resources, and sends a request message 2 on the resource 1. The node 3 selects a resource 2 from the plurality of third resources, and sends a request message 3 on the resource 2. Therefore, it can be learned that the node 1 and the node 2 select a same third resource, that is, the resource 1.

S205: The first node detects the first request message on the at least one third resource, and sends a response message to the plurality of nodes based on at least one fourth resource.

In a specific implementation, if a third resource used to carry a request message and a fourth resource used to carry a response message are alternately arranged. For example, in a transmission opportunity group, each transmission opportunity includes one third resource and one fourth resource, as shown in FIG. 5. In this case, each time the first node detects or receives a first request message on a third resource, the first node sends the first response message based on a fourth resource in the transmission opportunity in which the third resource is located, where the first response message indicates reception of the first request message.

For example, for the example of FIG. 5 in S204, the first node correspondingly receives, on the resource 1 in a transmission opportunity 1, the request message 1 sent by the node 1. A resource 2 in the transmission opportunity 1 corresponds to the resource 1 in the transmission opportunity 1. In this case, the first node sends a response message 1 on the resource 2 in the transmission opportunity 1, where the response message 1 indicates reception of the request message 1. In addition, the first node receives, on the resource 3 in a transmission opportunity 2, the request message 2 sent by the node 2. A resource 4 in the transmission opportunity 2 corresponds to the resource 3 in the transmission opportunity 2. In this case, the first node sends a response message 2 on the resource 4 in the transmission opportunity 2, where the response message 2 indicates reception of the request message 2. It should be noted that the first node receives only the request message 1 on the resource 1, and receives only the request message 2 on the resource 3.

In a specific implementation, the at least one fourth resource corresponding to the at least one third resource is located behind the at least one third resource. Each time the first node detects a first request message on a third resource, the first node sends the first response message based on a fourth resource corresponding to the third resource, where the first response message indicates reception of the first request message.

For example, in FIG. 7A, it is assumed that the first node receives, on a resource 1, a request message 1 sent by the node 1; receives, on a resource 2, a request message 2 sent by the node 2; but does not detect the first request message on a resource 3. The resource 1 corresponds to a resource 4. Therefore, the first node sends one response message on the resource 4. The response message indicates reception of the request message 1 on the resource 1 and reception of the request message 2 on the resource 2. The response message may carry a device identifier of the node 1 and a device identifier of the node 2.

For example, for the example of FIG. 6 in S204, correspondingly, because the node 1 sends the request message 1 on the resource and the node 2 sends the request message 2 on the resource 1, the request message 1 and the request message 2 on the resource 1 conflict. In this case, the first node may correctly receive one of the request messages. For example, if the request message 1 is received, the first node sends a response message 1 on a resource 4 corresponding to the resource 1, where the response message 1 indicates reception of the request message 1 on the resource 1. Further, the response message 1 may carry a device identifier of the node 1. In another specific implementation, if the request message 1 and the request message 2 on the resource 1 conflict, and the first node does not correctly receive any request message on the resource 1, the first node does not need to send a response message on the resource 4 corresponding to the resource 1. In addition, if the first node receives the request message 3 from the node 3 on the resource 2, the first node sends a response message 2 on a resource 5 corresponding to the resource 2, where the response message 2 indicates reception of the request message 3 on the resource 2.

In some possible embodiments, if the first node detects no first request message on each third resource, the first node does not need to send a response message.

S206: The plurality of nodes detect the response message on the at least one fourth resource.

In this embodiment of this application, that the plurality of nodes detect the response message on the at least one fourth resource is as follows: After each of the plurality of nodes sends the first request message based on a selected third resource, the node detects a response message on a fourth resource corresponding to the third resource, and determines, based on the response message, whether the request message from the node is successfully received by the first node.

The node 1 in the plurality of nodes is used as an example. In FIG. 5, if the node 1 sends the request message 1 on the resource 1 in the transmission opportunity 1, the node 1 detects a response message on the resource 2 in the transmission opportunity 1. If the node 1 receives the response message 1 on the resource 2, the node 1 determines, based on the response message 1, that the request message 1 sent by the first node is successfully received by the first node, where the response message 1 indicates reception of the response message 1. If the node 1 does not receive any response message on the resource 2, the node 1 determines that the first node does not receive the request message 1.

The node 1 in the plurality of nodes is used as an example. In FIG. 7A, if the node 1 sends the request message 1 on the resource 1, the node 1 may detect a response message on the resource 4 corresponding to the resource 1. It is assumed that the node 1 detects a response message 1 on the resource 4, and the response message 1 includes information indicating that the request message 1 is received, or the response message 1 carries the device identifier of the node 1. In this case, the node 1 determines, based on the response message 1, that the request message 1 sent by the node 1 is successfully received by the first node. If the node 1 does not receive any response message on the resource 4, the node 1 determines that the first node does not receive the request message 1.

It can be learned that, in this embodiment of this application, the first node may flexibly configure, based on a concurrency difference of a working environment, a quantity of resources for discovery/connection, and indicate the resource by using an extended broadcast message (that is, the second message), so that the plurality of nodes can select resources. This can reduce a waiting delay of a node. In addition, this enables each node to be fast connected to the first node in a high concurrency scenario, and can effectively reduce resource consumption in a low concurrency scenario. Moreover, this effectively implements resource time-division multiplexing, and improves resource utilization.

The foregoing describes in detail the methods in embodiments of this application, and the following describes apparatuses in embodiments of this application.

Figure 9:
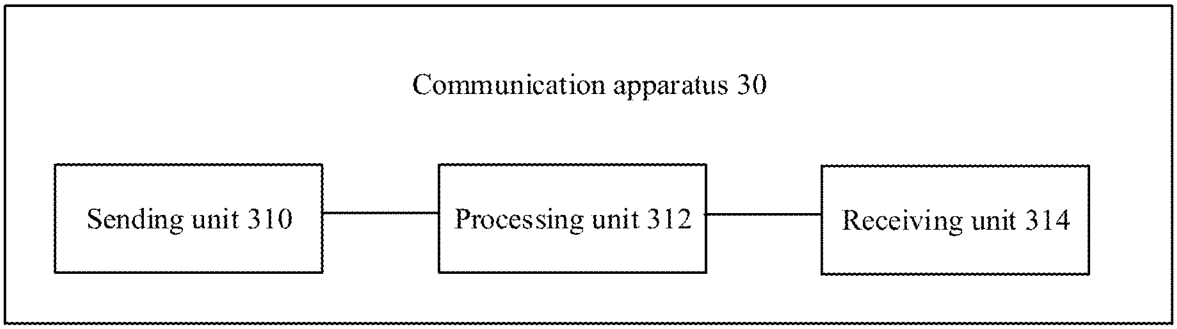
FIG. 9 is a schematic diagram of a functional structure of a communication apparatus according to an embodiment of this application.

Refer to FIG. 9. FIG. 9 is a schematic diagram of a functional structure of a communication apparatus according to an embodiment of this application. A communication apparatus 30 includes a sending unit 310, a processing unit 312, and a receiving unit 314. The communication apparatus 30 may be implemented by hardware, software, or a combination of software and hardware.

Specifically, the sending unit 310 is configured to send a first message on at least one broadcast frequency hopping channel, where the first message indicates a first resource on a first frequency hopping channel. The sending unit 310 is further configured to send a second message on the first resource, where the second message indicates a second resource, and the second resource includes at least one third resource. The processing unit 312 and/or the receiving unit 314 is configured to detect a request message on the at least one third resource, where the request message includes a discovery request message and/or an access request message. It should be noted that the processing unit and the receiving unit can separately or jointly implement message detection.

In a specific implementation, the receiving unit 314 receives a first request message on a third resource in a first transmission opportunity, and the sending unit 310 is further configured to send a first response message on a fourth resource in the first transmission opportunity, where the first response message indicates reception of the first request message.

In another specific implementation, the receiving unit 314 is configured to receive a first request message on a third resource, and the sending unit 310 is further configured to send a first response message on a fourth resource corresponding to the third resource, where the first response message indicates reception of the first request message.

In this case, the communication apparatus 30 may be configured to implement the method that is on a first node side and that is described in the embodiment in FIG. 3. In the embodiment in FIG. 3, the sending unit 310 may be configured to perform S101 and S102, and the processing unit 312 and/or the receiving unit 314 may be configured to perform S104. Alternatively, functional modules of the communication apparatus 30 may be configured to implement the method that is on a first node side and that is described in the embodiment in FIG. 8. For brevity of this specification, details are not described herein.

Only one or more of the units in the embodiment shown in FIG. 9 may be implemented by software, hardware, firmware, or a combination thereof. The software or firmware includes but is not limited to computer program instructions or code, and may be executed by a hardware processor. The hardware includes but is not limited to various integrated circuits, such as a central processing unit (CPU, Central Processing Unit), a digital signal processor (DSP, Digital Signal Processor), a field programmable gate array (FPGA, Field Programmable Gate Array), an application-specific integrated circuit (ASIC, Application-specific Integrated Circuit), and the like.

Figure 10:
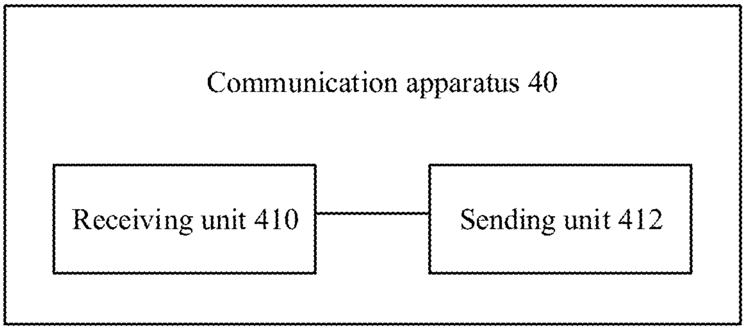
FIG. 10 is a schematic diagram of a functional structure of another communication apparatus according to an embodiment of this application.

Refer to FIG. 10. FIG. 10 is a schematic diagram of a functional structure of a communication apparatus according to an embodiment of this application. A communication apparatus 40 includes a receiving unit 410 and a sending unit 412. The communication apparatus 40 may be implemented by hardware, software, or a combination of software and hardware.

Specifically, the receiving unit 410 is configured to receive a first message from a first node on a first broadcast frequency hopping channel, where the first message indicates a first resource on a first frequency hopping channel. The receiving unit 410 is further configured to receive a second message on the first resource, where the second message indicates a second resource, and the second resource includes at least one third resource. The sending unit 412 is configured to send a first request message on one of the at least one third resource, where the first request message includes a discovery request message and/or an access request message. The receiving unit 410 is further configured to detect a response message from the first node on a fourth resource, where the fourth resource corresponds to one of the at least one third resource.

In this case, the communication apparatus 40 may be configured to implement the method that is on a second node side and that is described in the embodiment in FIG. 3. In the embodiment in FIG. 3, the receiving unit 410 may be configured to perform S101 and S102, and the sending unit 412 may be configured to perform S103. Alternatively, functional modules of the communication apparatus 40 may be configured to implement the method that is on a side on which a plurality of nodes are located and that is described in the embodiment in FIG. 8. For brevity of this specification, details are not described herein.

Only one or more of the units in the embodiment shown in FIG. 10 may be implemented by software, hardware, firmware, or a combination thereof. The software or firmware includes but is not limited to computer program instructions or code, and may be executed by a hardware processor. The hardware includes but is not limited to various integrated circuits, such as a central processing unit (CPU, Central Processing Unit), a digital signal processor (DSP, Digital Signal Processor), a field programmable gate array (FPGA, Field Programmable Gate Array), an application-specific integrated circuit (ASIC, Application-Specific Integrated Circuit), and the like.

Figure 11:
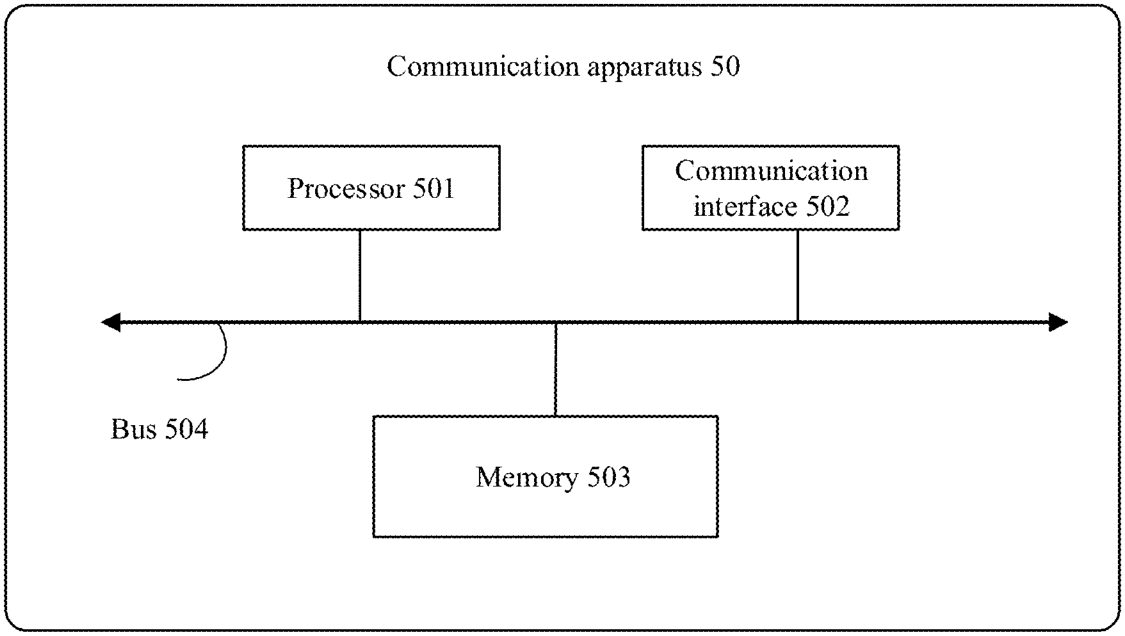
FIG. 11 is a schematic diagram of a structure of a communication apparatus according to an embodiment of this application.

Refer to FIG. 11. FIG. 11 is a schematic diagram of a structure of a communication apparatus according to an embodiment of this application. As shown in FIG. 11, a communication apparatus 50 includes a processor 501, a communication interface 502, a memory 503, and a bus 504.

In a specific implementation, the processor 501, the memory 503, and the communication interface 502 communicate with each other through the bus 504. It should be understood that a quantity of processors and a quantity of memories in the communication apparatus 50 are not limited in this application.

In a possible design, the communication apparatus 50 may be the first node in the embodiment in FIG. 3 or FIG. 8. In another possible design, the communication apparatus 50 may be the second node in FIG. 3 or any one of the plurality of nodes shown in FIG. 8. Specifically, the first node or the second node may be a primary node in an in-vehicle wireless communication scenario, for example, a cockpit domain controller (cockpit domain controller, CDC), a passive entry passive start (passive entry passive start, PEPS) system, or a mobile phone. The first node or the second node may alternatively be a base station, user equipment (user equipment, UE), or the like in a wide-area wireless communication system. The first node or the second node may alternatively be a base station, an access point (access point, AP), or the like in a local-area wireless communication system. The AP may be a wireless AP such as a wireless router, a wireless gateway, or a wireless bridge. The first node or the second node may alternatively be a vehicle, an on-board unit (On-board Unit, OBU), an intelligent wearable device (such as a sports wristband or a watch), a portable mobile device (such as a mobile phone or a tablet), or another sensor or device that can communicate with another node, such as a chip or a component in the portable mobile device. This is not specifically limited in embodiments of this application.

The bus 504 may be a peripheral component interconnect (peripheral component interconnect, PCI) bus, an extended industry standard architecture (extended industry standard architecture, EISA) bus, or the like. The bus may be categorized as an address bus, a data bus, a control bus, or the like. For ease of indication, the bus is indicated by using only one line in FIG. 11. However, it does not indicate that there is only one bus or only one type of bus. The bus 504 may include a path for transmitting information between components (such as the memory 503, the processor 501, and the communication interface 502) of the communication apparatus 50.

The processor 501 may include any one or more of processors such as a central processing unit (central processing unit, CPU), a microprocessor (microprocessor, MP), or a digital signal processor (digital signal processor, DSP).

The memory 503 is configured to provide storage space, and the storage space may store data such as an operating system and a computer program. The memory 503 may be one of or a combination of more than one of a random access memory (random access memory, RAM), an erasable programmable read-only memory (erasable programmable read-only memory, EPROM), a read-only memory (read-only memory, ROM), a compact disc read-only memory (compact disc read-only memory, CD-ROM), or the like. The memory 503 may exist independently, or may be integrated into the processor 501.

The communication interface 502 may be configured to provide information input or output for the processor 501. Alternatively, the communication interface 502 may be configured to receive data sent from the outside and/or send data to the outside, and may be an interface of a wired link such as an Ethernet cable, or may be an interface of a wireless link (such as Wi-Fi, Bluetooth, universal wireless transmission, or an in-vehicle short-range communication technology). Alternatively, the communication interface 502 may further include a transmitter (such as a radio frequency transmitter or an antenna), a receiver, or the like coupled to the interface.

In a specific implementation, when the communication apparatus 50 is the foregoing first node, the processor 501 in the communication apparatus 50 is configured to read a computer program stored in the memory 503, to perform the method that is on a first node side and that is described in the embodiment in FIG. 3 or FIG. 8.

In a possible design, the communication apparatus 50 may be one or more modules in the first node that performs the method shown in FIG. 3, and the processor 501 may be configured to read one or more computer programs stored in the memory 503, to perform the following operations:

send a first message on at least one broadcast frequency hopping channel by using a sending unit 310, where the first message indicates a first resource on a first frequency hopping channel; and send a second message on the first resource, where the second message indicates a second resource, and the second resource includes at least one third resource; and detect a request message on the at least one third resource by using a processing unit 312 and/or a receiving unit 314, where the request message includes a discovery request message and/or an access request message.

In another specific implementation, when the communication apparatus 50 is the foregoing second node, the processor 501 in the communication apparatus 50 is configured to read a computer program stored in the memory 503, to perform the method that is on a second node side and that is described in the embodiment in FIG. 3 or the method that is on a side on which a plurality of nodes are located and that is described in the embodiment in FIG. 8.

In a possible design, the communication apparatus 50 may be one or more modules in the second node that performs the method shown in FIG. 3, and the processor 501 may be configured to read one or more computer programs stored in the memory 503, to perform the following operations:

receive, by using a receiving unit 410, a first message from a first node on a first broadcast frequency hopping channel, where the first message indicates a first resource on a first frequency hopping channel; receive a second message on the first resource, where the second message indicates a second resource, and the second resource includes at least one third resource; and send a first request message on one of the at least one third resource by using a sending unit 412, where the first request message includes a discovery request message and/or an access request message.

An embodiment of this application further provides a communication system. The communication system includes a first node and a second node. The communication system is configured to perform the foregoing embodiments of this application, for example, the method described in FIG. 3 or FIG. 8.

The first node or the second node may be a primary node in an in-vehicle wireless communication scenario, for example, a cockpit domain controller (cockpit domain controller, CDC), a passive entry passive start (passive entry passive start, PEPS) system, or a mobile phone. The first node or the second node may alternatively be a base station, user equipment (user equipment, UE), or the like in a wide-area wireless communication system. The first node or the second node may alternatively be a base station, an access point (access point, AP), or the like in a local-area wireless communication system. The AP may be a wireless AP such as a wireless router, a wireless gateway, or a wireless bridge. The first node or the second node may alternatively be a vehicle, an on-board unit (On-board Unit, OBU), an intelligent wearable device (such as a sports wristband or a watch), a portable mobile device (such as a mobile phone or a tablet), a component in the portable mobile device, or another sensor or device that can communicate with another node, such as a chip or a component in the portable mobile device. This is not specifically limited in embodiments of this application.

An embodiment of this application further provides a terminal. The terminal includes at least one of a first apparatus and a second apparatus. The first apparatus may be the communication apparatus 30 shown in FIG. 9, and may be configured to perform the method that is on a first node side and that is described in the embodiment in FIG. 3 or FIG. 8. The second apparatus may be the communication apparatus 40 shown in FIG. 10, and may be configured to perform the method that is on a second node side and that is described in the embodiment in FIG. 3 or the method that is on a side on which a plurality of nodes are located and that is described in the embodiment in FIG. 8.

An example of the terminal includes but is not limited to: a smart household device (such as a television, a robotic vacuum cleaner, a smart desk lamp, an acoustic system, an intelligent lighting system, an electrical control system, home background music, a home theater system, an intercom system, or video surveillance), an intelligent transportation device (such as a car, a ship, an uncrewed aerial vehicle, a train, a truck, or a truck), an intelligent manufacturing device (such as a robot, an industrial device, intelligent logistics, or an intelligent factory), or an intelligent terminal (such as a mobile phone, a computer, a tablet, a palmtop computer, a desktop computer, a headset, a speaker, a wearable device, a vehicle-mounted device, a virtual reality device, or an augmented reality device).

In the foregoing embodiments in this specification, the description of each embodiment has respective focuses. For a part that is not described in detail in an embodiment, refer to related descriptions in other embodiments.

A person of ordinary skill in the art may understand that, all or some of the steps in each method of the foregoing embodiments may be implemented by a program instructing related hardware. The program may be stored in a computer-readable storage medium. The storage medium includes a read-only memory (Read-Only Memory, ROM), a random access memory (Random Access Memory, RAM), a programmable read-only memory (Programmable Read-only Memory, PROM), an erasable programmable read-only memory (Erasable Programmable Read-only Memory, EPROM), a one-time programmable read-only memory (One-time Programmable Read-Only Memory, OTPROM), an electrically erasable programmable read-only memory, (Electrically Erasable Programmable Read-Only Memory, EEPROM), a compact disc read-only memory (Compact Disc Read-Only Memory, CD-ROM) or another optical disc memory, a magnetic disk storage, a magnetic tape storage, or any other computer-readable medium that can be configured to carry or store data.

The technical solutions of this application essentially, or the part contributing to the conventional technology, or all or some of the technical solutions may be implemented in a form of a software product. The computer program product is stored in a storage medium and includes several instructions for instructing a device (which may be a personal computer, a server, a network device, a robot, a single-chip microcomputer, a chip, a robot, or the like) to perform all or some of the steps of the methods described in embodiments of this application.

What is claimed is:

1. A communication method, the method comprising:

sending a first message on at least one broadcast frequency hopping channel, wherein the first message indicates a first resource on a first frequency hopping channel, the at least one broadcast frequency hopping channel being different from the first frequency hopping channel;

sending a second message on the first resource, wherein the second message indicates a second resource, and the second resource comprises at least one third resource; and detecting a request message on the at least one third resource, wherein the request message comprises at least one of a discovery request message or an access request message, wherein the broadcast frequency hopping channel is determined based on a broadcast frequency hopping random seed and broadcast clock parameter information, wherein the first frequency hopping channel is determined based on a first frequency hopping random seed and first clock parameter information, and wherein the second resource is a transmission opportunity group, and wherein the second message comprises a frequency hopping random seed and clock parameter information of a frequency hopping channel of the transmission opportunity group.

2. The method according to claim 1, wherein the second message comprises information that indicates a quantity of third resources comprised in the second resource.

3. The method according to claim 1, wherein the second resource further comprises at least one fourth resource, wherein the at least one fourth resource is used to carry at least one response message, and the at least one response message corresponds to the detected request message.

4. The method according to claim 1, wherein the second resource is a transmission opportunity group, the transmission opportunity group comprises at least one transmission opportunity, and each transmission opportunity comprises a third resource.

5. The method according to claim 1, wherein the second message further indicates a start moment of the at least one third resource or a start moment of at least one transmission opportunity of the at least one third resource.

6. The method according to claim 4, wherein the second message further comprises one or more types of the following information:

information about a time length of the transmission opportunity group;

information about a start moment of the transmission opportunity group;

information about a quantity of transmission opportunities in the transmission opportunity group;

information about an interval between start moments of at least two adjacent transmission opportunities in the transmission opportunity group;

information about a start moment of a first transmission opportunity in the transmission opportunity group;

information about a frequency hopping channel of the transmission opportunity group or the at least one third resource;

information about a hopping frequency of the transmission opportunity group or the at least one third resource;

information about bandwidth of the transmission opportunity group or the at least one third resource;

a frequency hopping random seed;

information about an available frequency hopping channel; and clock parameter information.

7. The method according to claim 3, wherein each transmission opportunity in a transmission opportunity group comprises the fourth resource.

8. The method according to claim 7, wherein the detecting a request message on the at least one third resource comprises:

receiving a first request message on a third resource in a first transmission opportunity; and the method further comprises:

sending a first response message on a fourth resource in the first transmission opportunity, wherein the first response message indicates reception of the first request message.

9. The method according to claim 1, wherein the at least one third resource corresponds to at least one fourth resource, the at least one fourth resource is used to carry at least one response message, and the at least one response message corresponds to a request message from the at least one third resource.

10. The method according to claim 9, wherein the at least one third resource is in a one-to-one correspondence with the at least one fourth resource, or there is one fourth resource that is in the at least one fourth resource and that corresponds to a plurality of third resources.

11. The method according to claim 9, wherein the detecting a request message on the at least one third resource comprises:

receiving a first request message on a third resource; and the method further comprises:

sending a first response message on a fourth resource corresponding to the third resource, wherein the first response message indicates reception of the first request message.

12. The method according to claim 11, wherein the first request message comprises an identifier of a first device, the first request message is from the first device, and the first response message comprises the identifier of the first device.

13. The method according to claim 3, wherein the second message further indicates the at least one fourth resource.

14. The method according to claim 1, wherein the second message indicates one or more of the following:

at least one third resource is used to detect a discovery request message;

at least one third resource is used to detect an access request message; or one of the at least one third resource corresponds to a second node, and the second message comprises an identifier of the second node.

15. A communication method, the method comprising:

receiving a first message from a first node on a broadcast frequency hopping channel, wherein the first message indicates a first resource on a first frequency hopping channel, the broadcast frequency hopping channel being different from the first frequency hopping channel;

receiving a second message from the first node on the first resource, wherein the second message indicates a second resource, and the second resource comprises at least one third resource; and sending a first request message on one of the at least one third resource, wherein the first request message comprises at least one of a discovery request message or an access request message, wherein the broadcast frequency hopping channel is determined based on a broadcast frequency hopping random seed and broadcast clock parameter information, wherein the first frequency hopping channel is determined based on a first frequency hopping random seed and first clock parameter information, and wherein the second resource is a transmission opportunity group, and wherein the second message comprises a frequency hopping random seed and clock parameter information of a frequency hopping channel of the transmission opportunity group.

16. The method according to claim 15, wherein the second message comprises information that indicates a quantity of third resources comprised in the second resource.

17. The method according to claim 15, wherein the second resource further comprises at least one fourth resource, wherein the at least one fourth resource is used to carry at least one response message, and the at least one response message corresponds to the first request message.

18. The method according to claim 15, wherein the second resource is a transmission opportunity group, the transmission opportunity group comprises at least one transmission opportunity, and each transmission opportunity comprises a third resource.

19. The method according to claim 15, wherein the second message further indicates a start moment of the at least one third resource or a start moment of at least one transmission opportunity of the at least one third resource.

20. The method according to claim 18, wherein the second message further comprises one or more types of the following information:

information about a time length of the transmission opportunity group;

information about a start moment of the transmission opportunity group;

information about a quantity of transmission opportunities in the transmission opportunity group;

information about an interval between start moments of at least two adjacent transmission opportunities in the transmission opportunity group;

information about a start moment of a first transmission opportunity in the transmission opportunity group;

information about a frequency hopping channel of the transmission opportunity group or the at least one third resource;

information about a hopping frequency of the transmission opportunity group or the at least one third resource;

information about bandwidth of the transmission opportunity group or the at least one third resource;

a frequency hopping random seed;

information about an available frequency hopping channel; and clock parameter information.

21. The method according to claim 1, wherein the frequency hopping channel of the transmission opportunity group is determined based on a second frequency hopping random seed and second clock parameter information.

* * * * *